US 12,147,005 B2
Hori et al.
(45) Date of Patent: Nov. 19, 2024

(12) United States Patent
(10) Patent No.: US 12,147,005 B2

(54) ULTRASONIC PULSE-ECHO AND CALIPER FORMATION CHARACTERIZATION

(71) Applicant: Schlumberger Technology Corporation, Sugar Land, TX (US)

(72) Inventors: Hiroshi Hori, Clamart (FR); Kenji Endo, Kanagawa (JP); Mika Uno, Kanagawa (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 336 days.

(21) Appl. No.: 17/310,167

(22) PCT Filed: Jan. 22, 2020

(86) PCT No.: PCT/US2020/014606
§ 371 (c)(1),
(2) Date: Jul. 22, 2021

(87) PCT Pub. No.: WO2020/154399
PCT Pub. Date: Jul. 30, 2020

(65) Prior Publication Data
US 2022/0120928 A1    Apr. 21, 2022

Related U.S. Application Data

(60) Provisional application No. 62/795,972, filed on Jan. 23, 2019.

(51) Int. Cl.
*G01V 1/50*    (2006.01)
*E21B 47/002*    (2012.01)
(Continued)

(52) U.S. Cl.
CPC ............ *G01V 1/50* (2013.01); *E21B 47/0025* (2020.05); *E21B 47/0224* (2020.05);
(Continued)

(58) Field of Classification Search
CPC .... G01V 1/50; G01V 1/46; G01V 2210/1299; G01V 2210/1429; G01V 2210/324;
(Continued)

(56) References Cited

U.S. PATENT DOCUMENTS 3,747,702 A    7/1973 Beil
4,283,953 A *  8/1981 Plona ................ G01N 29/11
                                                     73/599

(Continued)

FOREIGN PATENT DOCUMENTS

WO    WO-2016016186 A1 * 2/2016 ........... E21B 47/101

OTHER PUBLICATIONS

International Search Report and Written Opinion issued in International Patent application PCT/2020/014606, mailed May 15, 2020, 11 pages.

(Continued)

*Primary Examiner* — Amine Benlagsir
(74) *Attorney, Agent, or Firm* — Dayo Aladeniyi

(57) ABSTRACT

A method can include, using a downhole tool, acquiring ultrasonic echo data of a borehole, where the ultrasonic echo data include echoes representative of material and borehole geometry responsive to reflection of ultrasonic energy that has a wide-band frequency range; filtering the ultrasonic echo data using at least one selected filter for multi-band frequency filtering corresponding to different frequency ranges of the wide-band frequency range to generate filtered data; and processing the filtered data to generate attribute values representative of physical characteristics the material, the borehole geometry, or the material and the borehole geometry.

20 Claims, 22 Drawing Sheets

(51) Int. Cl.
  *E21B 47/0224* (2012.01)
  *E21B 47/04* (2012.01)
  *E21B 47/14* (2006.01)
  *E21B 47/26* (2012.01)
  *E21B 49/00* (2006.01)
  *G01V 1/46* (2006.01)

(52) U.S. Cl.
  CPC .............. *E21B 47/04* (2013.01); *E21B 47/14* (2013.01); *E21B 47/26* (2020.05); *E21B 49/00* (2013.01); *G01V 1/46* (2013.01); *E21B 2200/20* (2020.05); *G01V 2210/1299* (2013.01); *G01V 2210/1429* (2013.01); *G01V 2210/324* (2013.01); *G01V 2210/60* (2013.01); *G01V 2210/74* (2013.01)

(58) Field of Classification Search
  CPC ........... G01V 2210/60; G01V 2210/74; G01V 2001/526; E21B 47/0025; E21B 47/0224; E21B 47/04; E21B 47/14; E21B 47/26; E21B 49/00; E21B 2200/20; E21B 47/085; G01N 29/11; G01N 29/12; G01N 2291/0232; G01N 29/028; G01N 29/032; G01N 2291/011; G01N 2291/02818; G01N 29/024; G01N 2291/044; G01N 29/42
  See application file for complete search history.

(56) References Cited

U.S. PATENT DOCUMENTS

| | | | |
|---|---|---|---|
| 5,354,956 A | 10/1994 | Orban et al. | |
| 5,644,550 A | 7/1997 | Priest | |
| 7,295,826 B1 * | 11/2007 | Cook | H04B 1/06 455/313 |
| 10,113,364 B2 * | 10/2018 | Moeny | H01F 38/08 |
| 2014/0204700 A1 | 7/2014 | Valero et al. | |
| 2015/0338378 A1 | 3/2015 | Lu | |
| 2016/0047238 A1 | 2/2016 | Zeroug et al. | |
| 2016/0120501 A1 | 5/2016 | Manbachi | |
| 2017/0115423 A1 | 4/2017 | Hori et al. | |
| 2017/0211366 A1 * | 7/2017 | Xiao | F04D 13/10 |
| 2017/0314385 A1 | 11/2017 | Hori et al. | |
| 2019/0203585 A1 * | 7/2019 | Nguyen | G01V 1/50 |
| 2020/0072039 A1 * | 3/2020 | Yang | G01N 29/227 |
| 2021/0103069 A1 * | 4/2021 | Jin | G01N 29/32 |

OTHER PUBLICATIONS

Brown, J. et al., "Imaging: Getting the Picture Downhole", Oilfield Review, Sep. 2015, pp. 4-21.

Hayman, A. J. et al., "Improved Borehole Imaging by Ultrasonics", SPE-28440-MS, presented at the SPE Annual Technical Conference and Exhibition, 1994, pp. 977-992.

Hayman, A.J., "Ultrasonic properties of oil-well drilling muds", IEEE Ultrasonics Symposium, Montreal, Quebec, Canada, 1989, (1), pp. 327-332.

Hayman, A.J. et al., "Improved Borehole Imaging by Ultrasonics", SPE-28440-PA, SPE Production Facilities, 1998, 13(01), pp. 5-13.

Orban, J. J. et al., "New Ultrasonic Caliper for MWD Operations", SPE-21947-MS, presented at the SPE/IADC Drilling Conference, Amsterdam, Netherlands, 1991, pp. 439-448.

Extended Search Report issued in European patent application No. 20745860.5 dated Sep. 1, 2022, 14 pages.

First Exam issued in Saudi Arabia patent Application No. 521422620 dated Dec. 18, 2022, 12 pages.

* cited by examiner

No Cutting, f1 1710

With Cutting, f1 1720

No Cutting, f2 1715

With Cutting, f2 1725

Method 1810

Input 1814

Machine Model 1818 → Output 1822

Method 1830

Input 1834

Machine Model 1838 → Output 1842

— 1 —
ULTRASONIC PULSE-ECHO AND CALIPER FORMATION CHARACTERIZATION

RELATED APPLICATION

This application claims priority to and the benefit of a U.S. Provisional Application having Ser. No. 62/795,972, filed 23 Jan. 2019, which is incorporated by reference herein.

BACKGROUND

Various field operations can be performed with respect to a geologic environment. Such operations can include exploration operations, development operations, production operations, etc., with respect to a reservoir in the geologic environment. As an example, an operation can be a drilling operation where a bore can be drilled into a geologic environment where the bore may be utilized to form a well. A rig may be a system of components that can be operated to form a bore in a geologic environment, to transport equipment into and out of a bore in a geologic environment, etc. As an example, a rig may include a system that can be used to drill a bore and to acquire information about a geologic environment, about drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform. As an example, a rig can be utilized for operation of a drillstring where the drillstring can include one or more downhole tools that can be moved in a borehole via the drillstring. As an example, a rig can be utilized to perform one or more wirelines operations, where one or more downhole tools can be moved in a borehole via wireline.

SUMMARY

A method can include, using a downhole tool, acquiring ultrasonic echo data of a borehole, where the ultrasonic echo data include echoes representative of material and borehole geometry responsive to reflection of ultrasonic energy that has a wide-band frequency range; filtering the ultrasonic echo data using at least one selected filter for multi-band frequency filtering corresponding to different frequency ranges of the wide-band frequency range to generate filtered data; and processing the filtered data to generate attribute values representative of physical characteristics the material, the borehole geometry, or the material and the borehole geometry. One or more computer-readable storage media can include processor-executable instructions, executable to instruct a downhole tool to: acquire ultrasonic echo data of a borehole, where the ultrasonic echo data includes echoes representative of material and borehole geometry responsive to reflection of ultrasonic energy that has a wide-band frequency range; filter the ultrasonic echo data using at least one selected filter for multi-band frequency filtering corresponding to different frequency ranges of the wide-band frequency range to generate filtered data; and process the filtered data to generate attribute values representative of physical characteristics the material, the borehole geometry, or the material and the borehole geometry. A downhole tool can include an ultrasonic energy emitter and echo receiver that receives echo data responsive to ultrasonic energy emissions; a plurality of filters configured to perform bandpass filtering of the echo data at one or more different central frequencies to generate filtered data; telemetry circuitry; and a downhole system that controls the ultrasonic energy emitter and echo receiver, controls the plurality of filters, controls extraction of attributes of bandpass filtered echo data, controls storage of the attributes, and controls transmission of at least a portion of the attributes via the telemetry circuitry. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
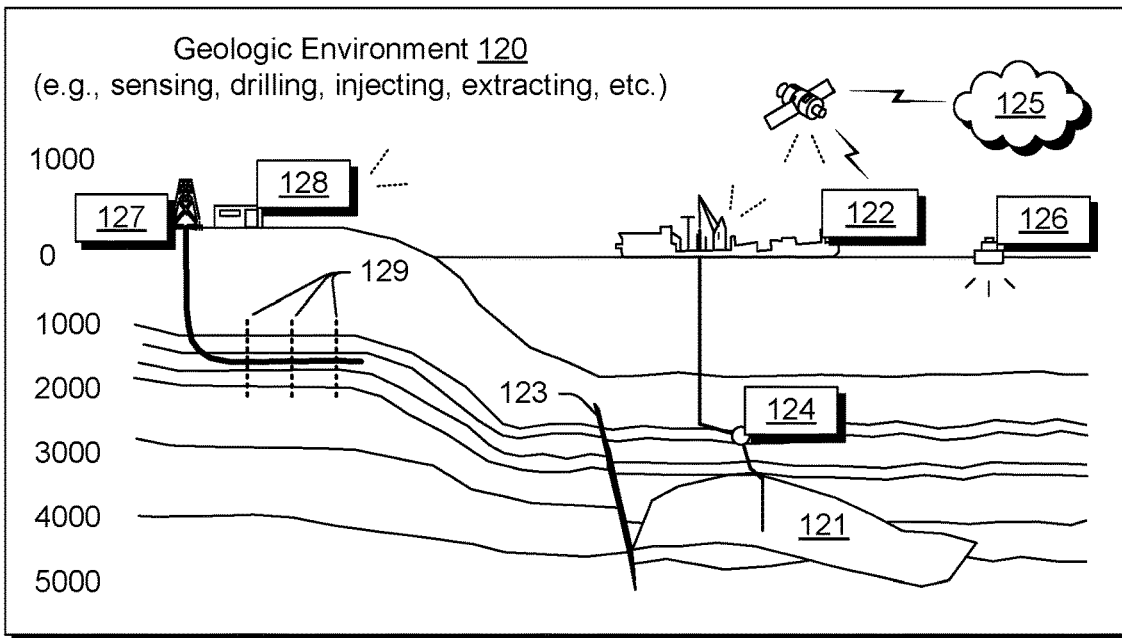
FIG. 1 illustrates examples of equipment in a geologic environment.
Figure 1:
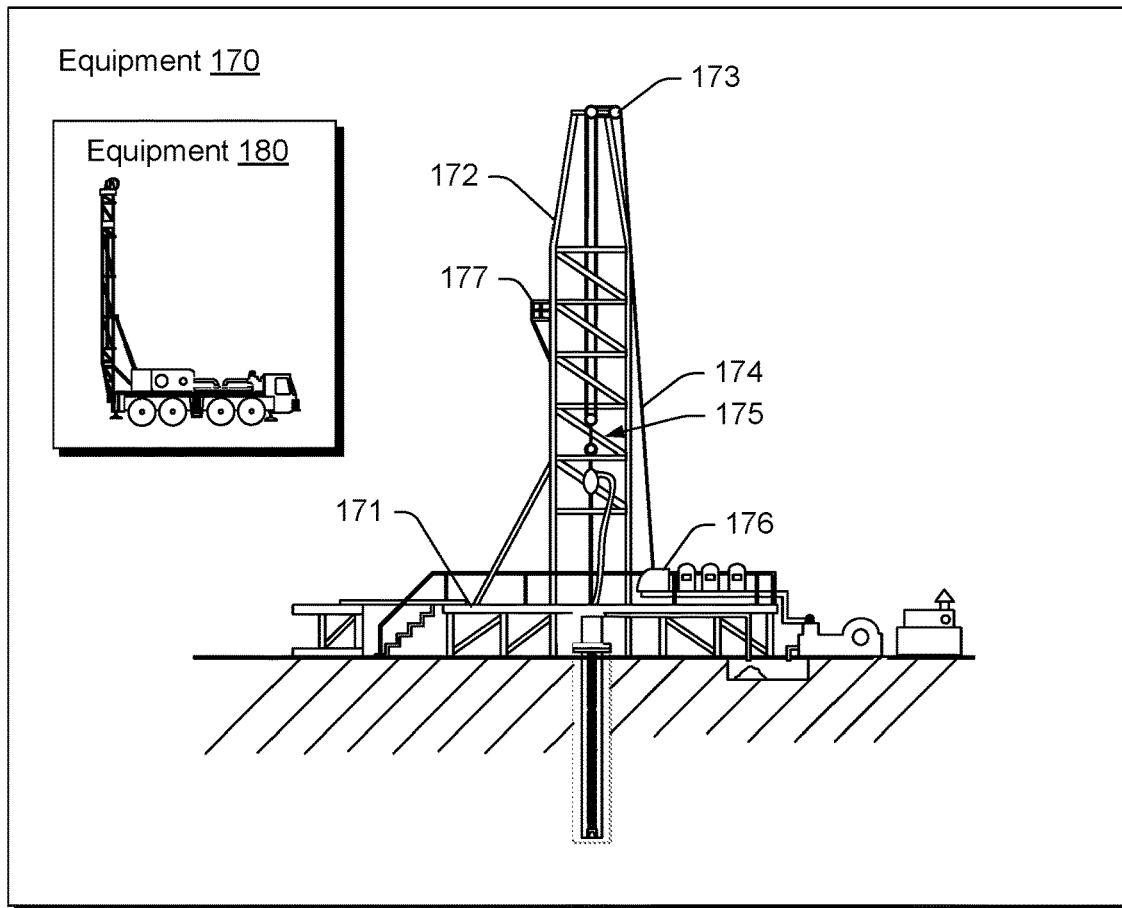

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. A planning process may call for performing various operations, which may be serial, parallel, serial and parallel, etc.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
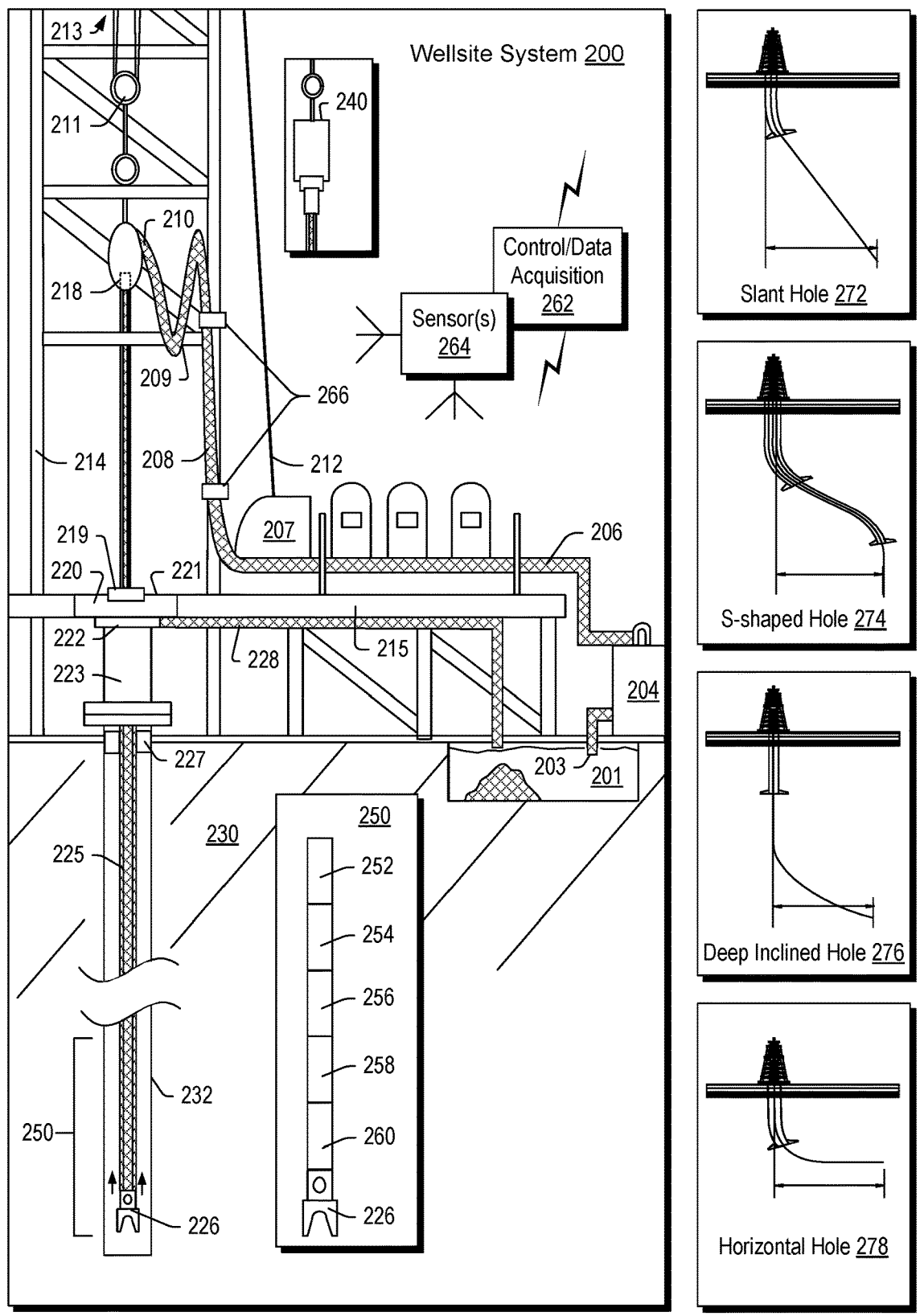
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to atop drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus. As an example, a downhole tool may output attributes that can characterize cuttings, the presence of cuttings, etc., where the attributes may be utilized for controlling drilling. For example, an ultrasonic downhole tool that can operate using various frequencies can output attributes that can characterize cuttings, the presence of cuttings, etc., which may inform a drilling operation as to risk of sticking as may be manageable via one or more actions (e.g., control of weight on bit, mud-motor rotation, surface rotation, control of mud flow, etc.).

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

Figure 3:
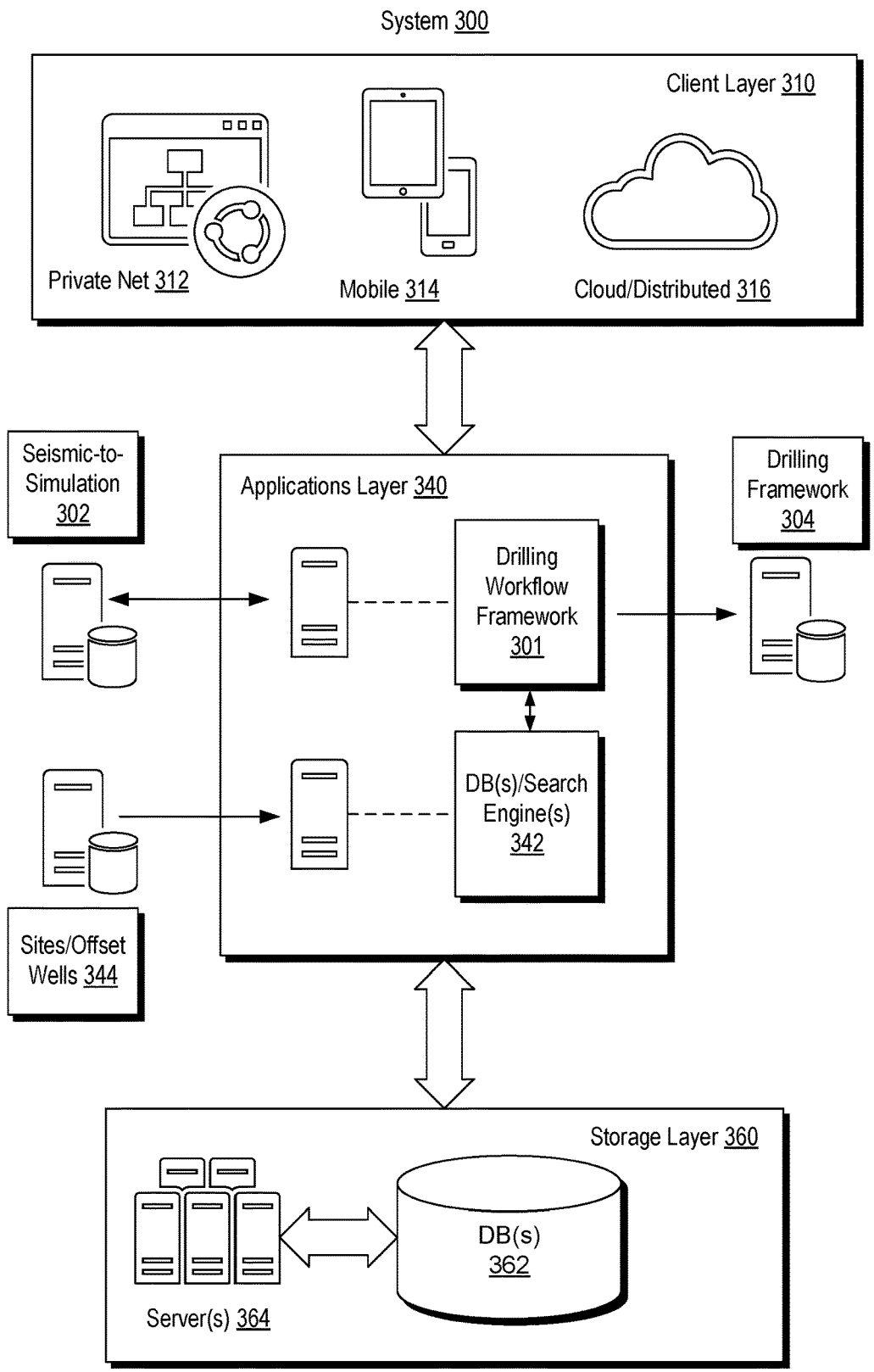
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360.

The client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engines modules.

As an example, the database management component 342 can include one or more search engine modules that provide for searching one or more information that may be stored in one or more data repositories. As an example, the STUDIO E&P knowledge environment (Schlumberger Ltd., Houston, Texas) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 3, the storage layer 360 can include various types of data, information, etc., which may be stored in one or more databases 362. As an example, one or more servers 364 may provide for management, access, etc., to data, information, etc., stored in the one or more databases 462. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, an architecture utilized in a system such as, for example, the system 300 may include features of the AZURE architecture (Microsoft Corporation, Redmond, WA). As an example, a cloud portal block can include one or more features of an AZURE portal that can manage, mediate, etc. access to one or more services, data, connections, networks, devices, etc.

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
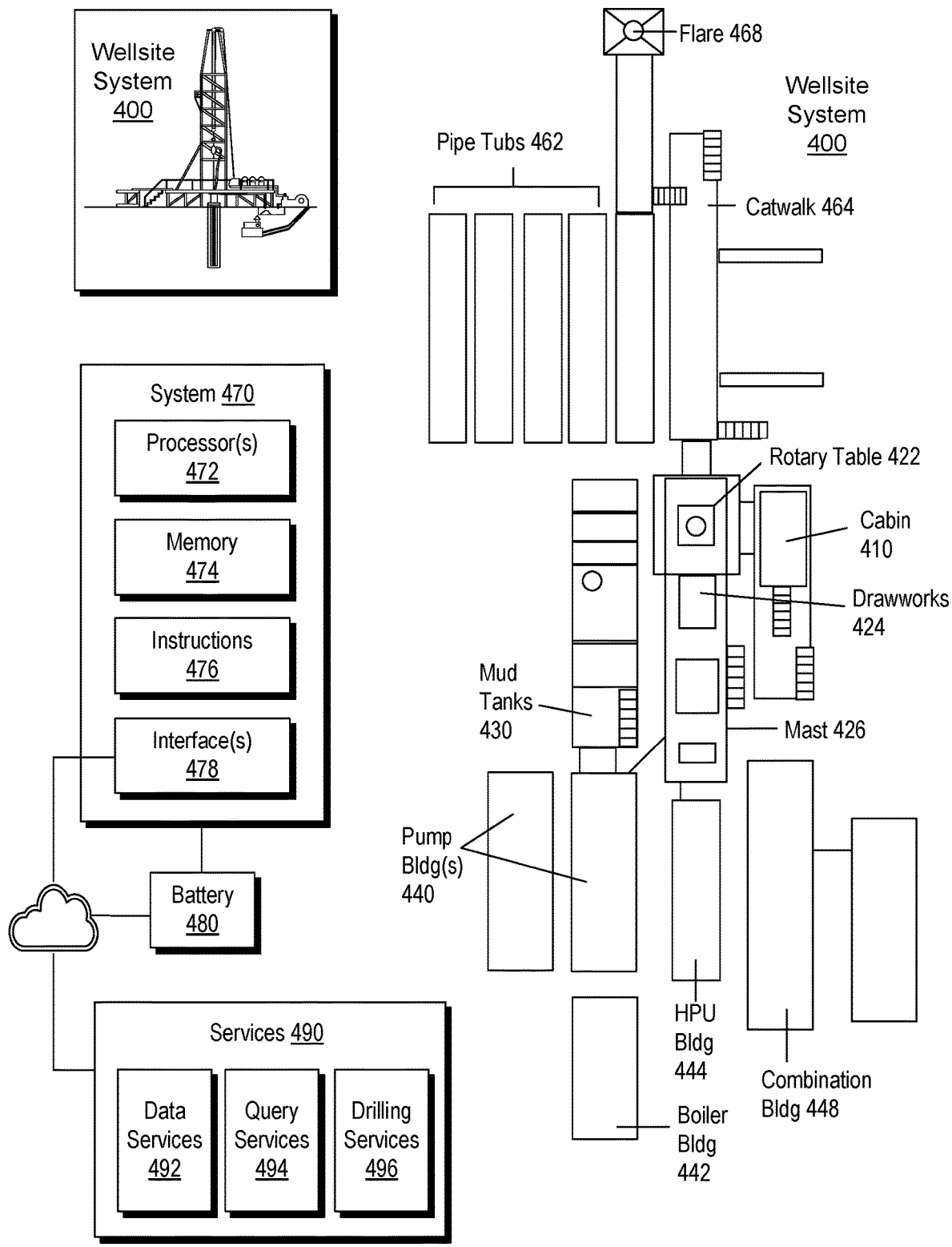
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design. Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory. In some embodiments, a second engineering service provider may perform such design using one of more software applications. Such designs may be stored in one or more databases maintained by one or more servers, which may, for example, employ STUDIO framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like. As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters. As an example, operating parameters, formation encountered, data collected while drilling (e.g., using logging-while-drilling or measurement-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review. As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
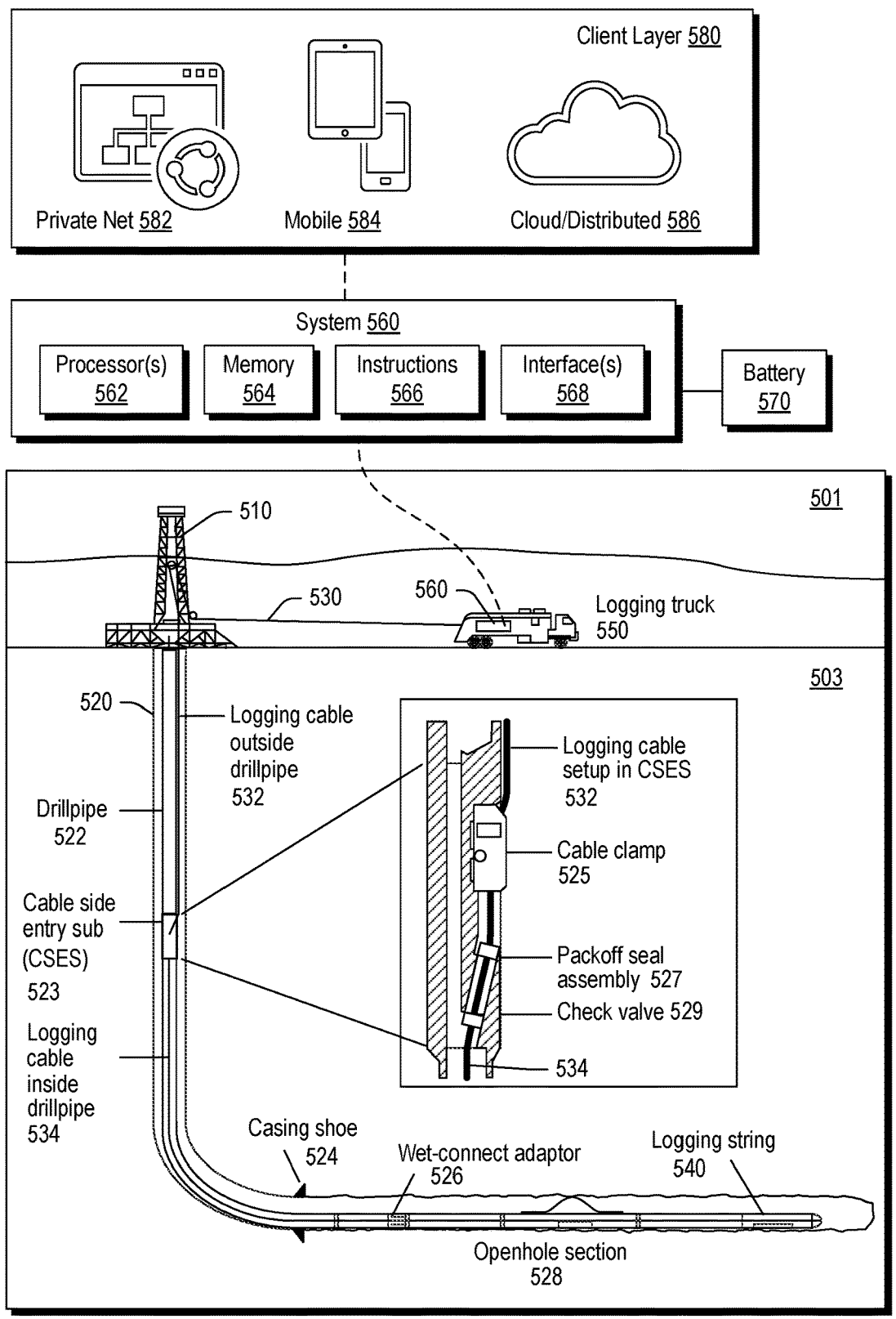
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

Figure 6:
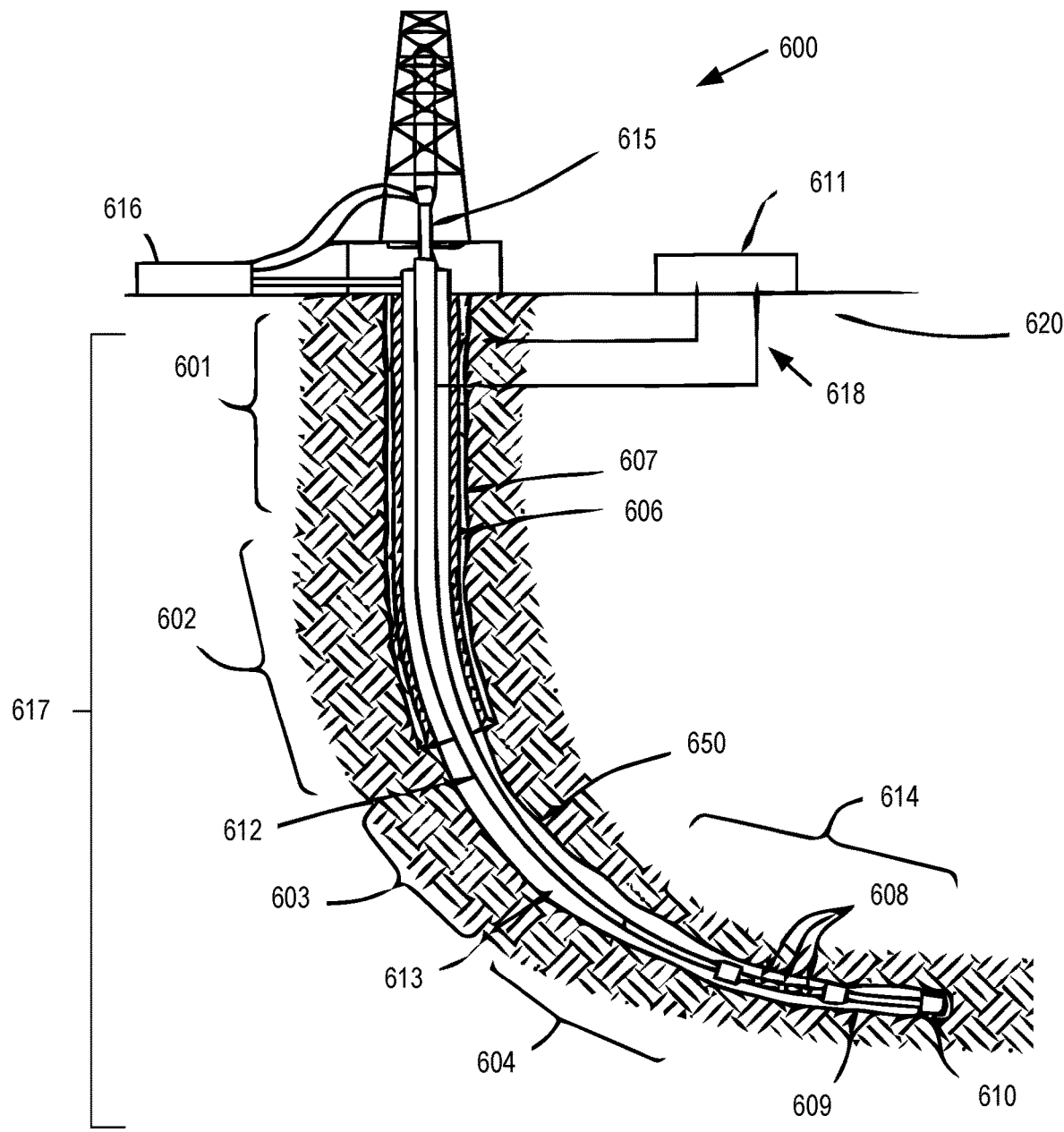
FIG. 6 illustrates an example of a system.

FIG. 6 shows a schematic diagram depicting an example of a drilling operation of a directional well in multiple sections. The drilling operation depicted in FIG. 6 includes a wellsite drilling system 600 and a field management tool 620 for managing various operations associated with drilling a bore hole 650 of a directional well 617. The wellsite drilling system 600 includes various components (e.g., drillstring 612, annulus 613, bottom hole assembly (BHA) 614, kelly 615, mud pit 616, etc.). As shown in the example of FIG. 6, a target reservoir may be located away from (as opposed to directly under) the surface location of the well 617. In such an example, special tools or techniques may be used to ensure that the path along the bore hole 650 reaches the particular location of the target reservoir.

As an example, the BHA 614 may include sensors 608, a rotary steerable system 609, and a bit 610 to direct the drilling toward the target guided by a pre-determined survey program for measuring location details in the well. Furthermore, the subterranean formation through which the directional well 617 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 601, 602, 603 and 604) corresponding to the multiple layers in the subterranean formation. For example, certain sections (e.g., sections 601 and 602) may use cement 607 reinforced casing 606 due to the particular formation compositions, geophysical characteristics, and geological conditions.

In the example of FIG. 6, a surface unit 611 may be operatively linked to the wellsite drilling system 600 and the field management tool 620 via communication links 618. The surface unit 611 may be configured with functionalities to control and monitor the drilling activities by sections in real-time via the communication links 618. The field management tool 620 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 618 according to a drilling operation workflow. The communication links 618 may include a communication subassembly.

During various operations at a wellsite (see, e.g., FIGS. 1, 2, 4, 5 and 6), data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real-time data associated with one or more operations such as, for example, a drilling operation or drilling operations. As an example, consider the PERFORM toolkit framework (Schlumberger Limited, Houston, Texas).

As an example, a service can be or include one or more of OPTIDRILL, OPTILOG and/or other services marketed by Schlumberger Limited, Houston, Texas.

The OPTIDRILL technology can help to manage downhole conditions and BHA dynamics as a real-time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO framework).

The OPTILOG technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Texas), which may include information from various operations (e.g., drilling operations) as associated with various drill bits, drilling conditions, formation types, etc.

As an example, one or more QTRAC services (Schlumberger Limited, Houston Texas) may be provided for one or more wellsite operations. In such an example, data may be acquired and stored where such data can include time series data that may be received and analyzed, etc.

As an example, one or more M-I SWACO services (M-I L.L.C., Houston, Texas) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX services (e.g., via the ONE-TRAX software platform, M-I L.L.C., Houston, Texas) may be provided for one or more wellsite operations. In such an example, data may be acquired and stored where such data can include time series data that may be received and analyzed, etc.

As to drilling, a measurement may be weight on bit, which may be acquired via one or more pieces of equipment (e.g., surface and/or subsurface). Actual weight on bit (WOB) can be provided in part by drill collars, which are thick-walled tubular pieces machined from solid bars of steel (e.g., plain carbon steel, etc.) and/or nonmagnetic nickel-copper alloy or other nonmagnetic premium alloys. Gravity can act on the large mass of the drill collars to provide downward force for the bits to efficiently break rock. To accurately control the amount of force applied to the bit, a driller and/or a control system can monitor surface weight measured via one or more sensors while the bit is just off the bottom of a wellbore, where a drillstring (and the drill bit) is slowly and carefully lowered until it touches bottom and as the driller continues to lower the top of the drillstring such that more and more weight is applied to the bit, and correspondingly less weight is measured as hanging at the surface. As an example, if the surface measurement shows 20,000 pounds (e.g., 9080 kg) less weight than with the bit off bottom, then a control system can determine 20,000 pounds (e.g., 9080 kg force) force on the bit (e.g., in a vertical hole). Various downhole MWD sensors can measure WOB, which may be more accurate than surface measurements. As an example, a MWD sensor may measure WOB and transmit the measured WOB data to the surface (e.g., a surface control system, a surface controller, etc.). As may be appreciated, WOB is a variable that can change during drilling operations and may be utilized in a time series approach to determine types of actions, degree of actions, success of actions, failure of actions, etc.

Various operations can be performed in a manner that utilizes one or more pieces of equipment that move. For example, consider a block, which may be a traveling block. A traveling block can include a set of sheaves that move up and down in a derrick. In such an example, wire rope can be threaded through the set of sheaves that is threaded (or "reeved") back to stationary crown block(s) located on the top of the derrick. Such a pulley system can provide mechanical advantage to the action of the wire rope line, enabling heavy loads (e.g., drillstring, casing and liners) to be lifted out of or lowered into a bore. Such operations may include tripping in operations or tripping out operations of one or more pieces of equipment with respect to a borehole, a well, etc.

As an example, equipment may be utilized to acquire caliper measurements (e.g., borehole caliper measurements). Knowledge of a borehole diameter while it is being drilled may be utilized to perform one or more remedial actions, optionally in real time. Such an approach can help to diminish non-productive time (NPT), for example, as to tripping a drillstring and conducting open-hole logging activities. As an example, if a diameter of a borehole is over-gauge, such fact may indicate that there is inappropriate mud flow, or an improper mud chemical characteristic or that the well hydrostatic pressure is too low, or that there is some other source of well-bore instability. As an example, if a diameter of a borehole is below gauge or nominal size, such fact may indicate that the bit is worn and to be replaced so as to help reduce demand for later well reaming activities, etc. Borehole diameter data may be utilized to help reduce risk of sticking (e.g., stuck pipe). As an example, monitoring of borehole diameter when a drillstring is tripped out of the borehole can provides data to a driller regarding proper drilling fluid characteristics as they relate to formation properties.

Knowledge of borehole diameter can aid a driller when deviated holes are being drilled. When a borehole is out of gauge, directional drilling may become more difficult because the drillstring, bottom-hole assembly (BHA), and collar stabilizers may not contact (e.g., full-contact, etc.) borehole walls as predicted by the driller. Real time knowledge of borehole diameter can be utilized for making directional drilling decisions. Such decisions may reduce NPT (e.g., tripping, etc.).

In LWD operations, certain measurements (e.g., nuclear, sonic, resistivity measurements of a formation) can be sensitive to borehole diameter. Knowledge of the borehole diameter under certain circumstances can be helpful for validating or adjusting such measurements.

As an example, a tool can include ultrasonic transducers on diametrically opposed sides of a drilling sub. Such a tool can be configured to receive echoes of emitted ultrasonic pulses from borehole walls; however, such reception may be noisy, for example, due to equipment noise, drill cuttings in the drilling fluid, etc. Measurements may be somewhat inaccurate where a tool (e.g., a sub of a drillstring) is not centralized with the axis of the borehole. Such inaccuracy may occur where the drilling sub is adjacent the borehole wall and the diameter of the sub is smaller than the diameter of the borehole. Under such conditions, the "diameter" sensed by the drilling sub can be in reality a chord of the borehole which is smaller than the actual borehole diameter.

As an example, a tool may provide for borehole gas influx detection. Gas influx, or a "kick" into a borehole can be a hazard in drilling as kicks, if uncontrolled, may increase risk of or cause blowouts. Because a kick can lead to a blowout with possible detrimental results, a probe adapted for inclusion in a drill string member may be utilized to detect conditions. Such a probe may include an ultrasonic transducer which serves to emit acoustic pulses and receive echo signals. A gap in the path of the ultrasonic pulses is provided so that drilling fluid may enter the gap. Reflections from a near surface of the gap and from a far surface of the gap can be analyzed. Such analysis may permit determination of the speed of sound of the drilling fluid, acoustic attenuation, the product of fluid density and compressibility, viscosity etc. However, in a down-hole measurement-while-drilling environment, because the probe gap may quickly become caked or filled with mud particulate, it may not be practical. Such caking of the gap can renders the probe inoperable for determining characteristics of downhole drilling fluid. Further, the presence of cuttings in the drilling fluid can affect reflections received by an ultrasonic transducer.

As an example, a tool can provide for ultrasonic emissions and echo reception in a drilling environment, for example, during a drilling operation where the tool is part of a drillstring.

As an example, a drilling environment in which an ultrasonic sensor is to function, if it is to measure borehole and drilling fluid characteristics while drilling, can present some challenges. For example, shocks and vibrations up to 650 G's/ms of the drillstring can confound an improperly constructed and instrumented ultrasonic sensor assembly. Measurement while drilling sensors can be constructed with integrity to survive for several days or more. Such sensors may be more robust than a wireline logging sensors, because drilling tends to continue for an extended time (e.g., longer than wireline operation). Noise created by the speed of drilling fluid (e.g., through drilling tools and/or annuli) and/or by tools impacting rock formations can present signal to noise issues. As an example, a sensor may be utilized that is of an integrity sufficient to withstand pressures up to 20,000 psi or more and temperatures up 150 degrees C. or more, as well as, for example, considerable mechanical abrasion (e.g., and direct hits on the sensor face).

As an example, a tool can perform measurements-while-drilling of a borehole diameter and tool standoff via pulse-echo techniques, for example, by recognizing and attenuating reflections from cuttings in drilling fluid returning to surface between the tool and the borehole wall (e.g., tool-wall annulus). A tool may include circuitry that can be configured to statistically process measurement downhole (e.g., to improve accuracy of such measurements).

As an example, equipment can include a mount for a pulse echo sensor on or near a stabilizer of a drilling tool, which may help to minimize inaccuracies caused by such tool not being centralized with the axis of a borehole.

As an example, a tool can include telemetry circuitry, which may, for example, provide for communication with a surface unit (e.g., directly and/or indirectly).

As an example, an ultrasonic system may be disposed within a measurement-while drilling (MWD) or logging-while-drilling (LWD) apparatus to perform one or more of borehole caliper monitoring, gas influx detection, imaging, etc.

As an example, a system can includes an ultrasonic transceiver installed in a drill collar. Such a drill collar may function in the drilling process to put weight on the bit, etc. In other words, it can function as an ordinary drill collar independent of the MWD measuring apparatus. As an example, a second transceiver may be installed at an azimuthal opposed position of the first transceiver in the same collar, and at approximately the same axial position (e.g., within several centimeters). Such a second transceiver can be utilized to improve the reliability of one or more measurements, processes, etc.

As an example, a transceiver can generate an ultrasonic pulse in mud in a direction such as a direction perpendicular to a face of a collar. In such an example, a wave pulse can travel through the mud, reflects from a formation surface and return to the same transceiver which, after the ultrasonic pulse has been emitted, acts as a receiver. The travel time of the pulse in the mud can be proportional to the standoff distance of the tool from the borehole wall.

As an example, a transceiver can include a solid "delay-line" between a ceramic sensor and the drilling fluid. Such a "delay-line" can reflect a portion of the emitted sonic pulse back to the sensor from the interface of the delay line and the mud. The amplitude of such a pulse can be related to the sonic impedance of the mud. Such sonic impedance can depend directly on the amount of gas in the mud (e.g., on the density of the mud). The sonic impedance of mud can be a parameter for down-hole gas influx detection.

Providing a delay-line in front of a sonic sensor can allow for echo detection where the tool is close to the borehole. Such a delay-line can provide for one or more of focusing, protection of the sensor, and one or more other mechanical functions.

As an example, in addition to a transceiver, a drillstring collar can include one or more types of electronic circuits (e.g., circuitry), for example, consider a processor and memory that includes executable instructions for control (e.g., of the sensor for transmission and reception of echo signals and processing thereof). As an example, processed signals may be stored in down-hole memory (e.g., caliper, etc.) or may be transmitted to the surface by a measurement-while-drilling mud pulse device or other technique (e.g., wired and/or wireless). Storage and/or transmission may be used together or individually. As an example, process may occur in real-time where result(s) of processing may be utilized in decision making during a drilling operation (e.g., of a borehole and/or of another borehole).

As an example, a tool can provide a standoff measurement to determine the hole diameter when the tool is rotating (e.g., during drilling) or when the tool is not rotating or when the tool is stationary or when the tool is translating (e.g., tripping, which may or may not include some amount of rotation). As an example, when a tool is rotating, a transceiver can send an acoustic pulse through a mud gap distance between the tool and borehole wall. Such a gap tends to vary with the tool rotation. The measured standoffs can be accumulated for processing and an average borehole diameter calculated (e.g., after several turns, etc.). Several standoff measurements may, for example, be evaluated each second. For example, consider a drill bit and/or drillstring rotation speed of between about 50 to 200 RPM, with an average accumulation time from about 10 to about 60 seconds to generate data sufficient for accurate averaging. As mentioned, various types of operations can employ rotary steerable systems (RSS) or may employ PDM systems. A tool can be suitable for either of the foregoing types of systems or, for example, another type of system.

As an example, a tool can include multiple transceivers. For example, consider a second transceiver diametrically opposed from a first transceiver where the second transceiver can improve measurements when the tool axis moves from side to side in borehole during drilling. In such an example, one transceiver can measure the standoff on its side. Then, for example, simultaneously or immediately thereafter, the other transceiver can measure the standoff on the other side of the tool. As an example, an instantaneous firing of both transceivers may occur or firing can be sequential, for example, as long as tool movement in the time between the two transceiver measurements tends to be relatively small.

As an example, a borehole diameter can be determined by adding the tool diameter to the standoffs measured on successive and/or simultaneous firings. As an example, a number of borehole diameter determinations may be accumulated and averaged to produce a borehole measurement. As an example, processing may occur for rejection of false echoes. Such processing can identify formation echoes that occur after echoes from drilling cuttings in the drilling fluid. The processing may also distinguish formation echoes from its multiple arrivals, and from sensor noise.

As an example, a transceiver may be mounted proximate to a stabilizer or on the stabilizer blades of a collar. Such placement of the transceiver can improve accuracy of a caliper measurement and/or other measurement.

As an example, an ultrasonic sensor assembly can include a sensor stack that includes an inner sound absorbing backing element, a piezo-electric ceramic disk stacked outwardly adjacent the backing element, and a delay-line. Such a delay-line can be fabricated of rigid plastic material and disposed outwardly of a ceramic disk. Such a delay-line can include an outwardly facing depression for focusing an ultrasonic pulse into drilling mud toward a borehole wall. As an example, an elastomer or epoxy can fill a depression to present a smooth face to flowing mud and a borehole wall.

As an example, a sensor assembly can include electrodes attached to outer and inner surfaces of a ceramic disk and connector pins for connecting the assembly to an electronics unit(s) disposed within a drilling collar (e.g., or other downhole equipment). Such an electronics unit(s) can include control and processing circuitry and, for example, stored logic for emitting ultrasonic pulses via a ceramic disk sensor and for generating echo signals representative of echoes of such pulses which return to the ceramic disk sensor. As an example, an electronics unit can include or be operatively coupled to a source of electrical energy (such as a battery or source of DC current from a MWD tool) and downhole memory for storing signals as a function of time. As an example, a sensor assembly may include an interface that can interface with an MWD telemetry unit for transmitting measurement information to the surface while drilling in real time and/or another type of telemetry unit (e.g., wired and/or wireless).

As an example, a backing element of an ultrasonic sensor assembly may be characterized by a solid portion (e.g., cylindrical in shape, etc.) disposed inwardly adjacent to a ceramic disk and a frusto-conical portion disposed inwardly adjacent the solid cylindrical portion.

As an example, a sensor stack can include a rubber jacket disposed around backing material, a ceramic disk, and a matching layer disposed outwardly adjacent the ceramic disk. As an example, a tube of elastomeric material may be placed between a rubber jacket and a metallic cup in which a sensor stack is placed. A delay-line may be spring mounted in a cup outwardly of a rubber jacket and an elastomeric tube which surrounds a sensor stack.

As mentioned, noise can stem from multiple sources, conditions, etc. As an example, consider noise present in the vicinity of a sensor stack of a tool as including one or more of drilling noise and pumping noise which tends to be of a lower frequency band than that of a formation echo signal but may extend into the frequency range of the formation echo signal. As mentioned, issues can arise with respect to drill cuttings as well.

Drilling noise and pumping noise may be mechanically and acoustically filtered as a result of structural sensor mounting and viscous drilling mud and/or, for example, by backing that is coupled to a piezoelectric sensor element. A backing element may be shock protected by a metal housing and a resin cap that envelop the sensor element.

Together with mechanical and acoustic filtering, electronic filtering may be achieved by an electronic bandpass filter placed prior to signal amplification to avoid amplifier and/or analog-to-digital converter saturation which could mask ultrasonic signal detection during saturation and recovery time.

Figure 7:
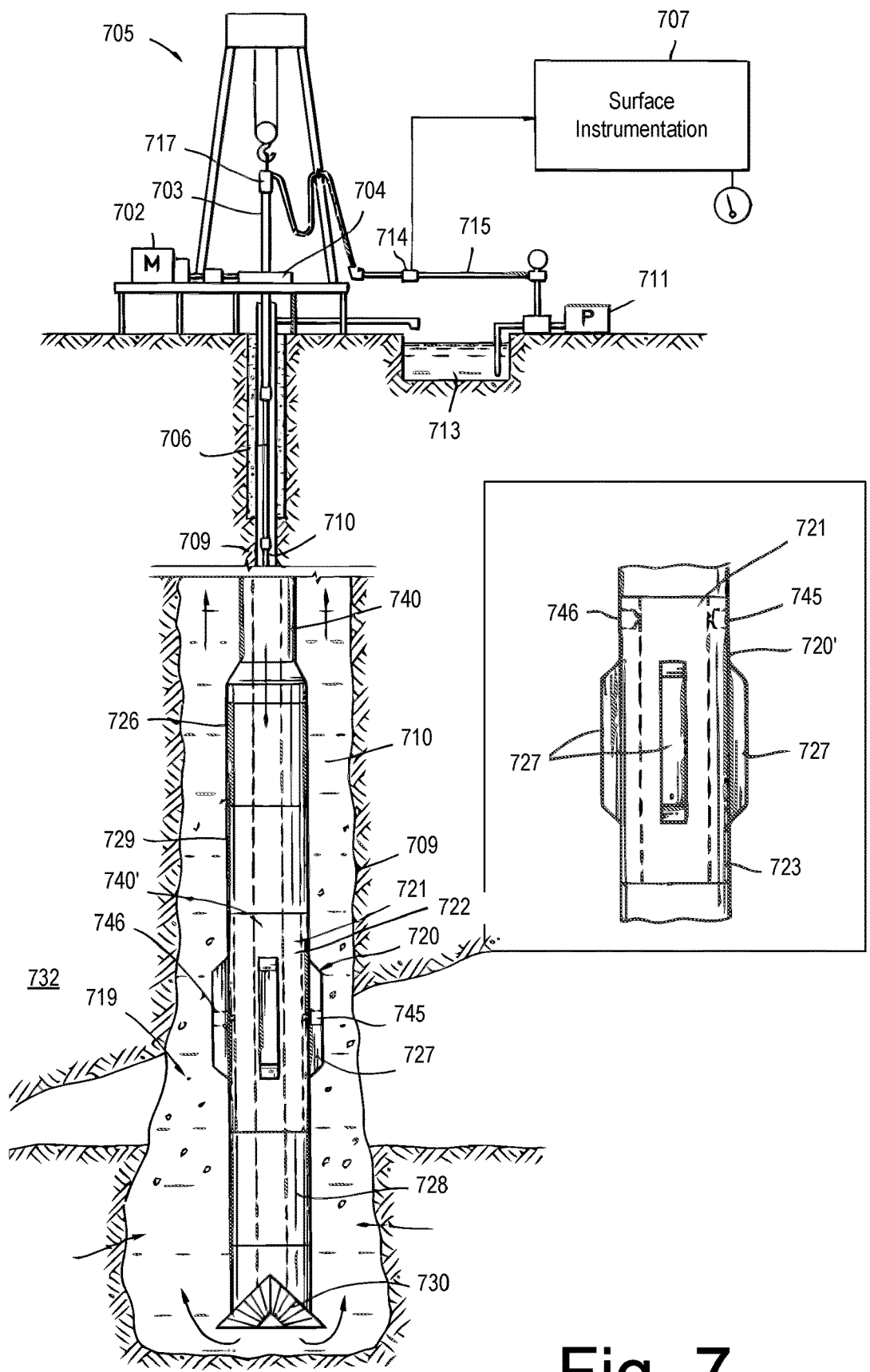
FIG. 7 illustrates examples of equipment.

FIG. 7 illustrates an example of an ultrasonic measurement tool placed in a drill string of a rotary drilling system, where the tool measures borehole diameter and fluid influx while the drill string is turning or stationary and illustrates an example of an alternative placement of an ultrasonic sensor assembly in the wall of a drill collar, rather than in stabilizing fins of such drill collar (see inset).

As an example, a tool can include components for making ultrasonic pulse-echo measurements utilizing wide-band excitation electronics. For example, consider a range that is from approximately 20 kHz to approximately 1000 kHz as a lower frequency (e.g., a minimum frequency) and an upper frequency (e.g., a maximum frequency), respectively. As an example, a lower frequency may be higher, for example, at approximately 50 kHz. As an example, an upper frequency may exceed 1000 kHz (e.g., be greater than 1 MHz). Such a tool may be controllable as to excitation, for example, to utilize one or more frequencies and/or one or more bands of frequencies for excitation. Such a tool can receive echoes and include circuitry that can process received echoes (e.g., analog, digital or analog and digital). For example, consider a tool that can extract echo attributes at multiple central frequencies by applying a plurality of different bandpass filters. In such an example, the filters can include filters of one or more types, such as electronics filters with multiple signal separator/divider or digital signal processing filters (e.g., DSP filters, field-programmable gate array (FPGA) filters, etc.). As an example, electronics filters may be included for a plurality of bands and optionally be selectable. As an example, DSP circuitry may be adjustable as to a band or bands. As an example, cascades of filters may be utilized. For example, consider combinations of one or more of lowpass, highpass and bandpass filters. As an example, one or more other types of filters and/or analog and/or digital signal processing may be performed via components in a tool.

As to "ultrasound" or "ultrasonic", frequencies can be greater than or equal to 20 kHz. As an example, a tool may include one or more components that can emit energy and/or receive echoes that may be at frequencies less than 20 kHz.

As an example, a tool can include or be operatively coupled to a controller system that is designed to take following parameters using embedded downhole circuitry (e.g., processor, memory, instructions, etc.) for multi-frequency measurements:

a. Central frequency (e.g., 125, 250, 375 and 500 kHz) or another value or values (e.g., singly or in combination);
   b. Passband (e.g., as may be determined from magnitude decay at half-pass band width, etc.) with, for example, 125 kHz and/or 250 kHz band widths (e.g., or other band widths).
   c. Minimum reliable amplitude thresholds (e.g., close to or larger than one or more of electronics, internal transducer ringing and mechanical noise while drilling) where such thresholds may be pre-set referring laboratory or field test data and/or adjustable (e.g., selectable, etc.).

As an example, a tool can provide for maximizing imaging and interpretation capabilities of multi-frequency attributes that are extracted from a one or more wide frequency measurements. As an example, a tool can generate data that can be suitable for presentation (e.g., rendering to a display, etc.) in image or curve format, for example, for one or more different geological and geomechanical applications (e.g., for oil and gas exploration and/or production purposes). As such, the tool can transform raw data into a form that represents real, tangible properties and/or characteristics of a real, tangible downhole environment (e.g., formation, fluid, etc.);

As an example, consider a tool that can generate low frequency attributes for one or more of:

i. Formation characterization for acoustic impedance less affected by surface rugosity and cuttings; and
ii. Robust caliper in attenuative well fluid or/and enlarged wellbore sections where echo magnitude reduction is proportional to acoustic attenuation rate of well fluid and distance.

As an example, consider a tool that can generate high frequency attributes for one or more of:

i. Wellbore surface characterization for vugs and fractures taking benefit of higher sensitivity to relatively small geometrical changes; and
ii. High spatial resolution imaging due to smaller ultrasonic beam diameter.

As an example, a tool can be utilized in one or more types of operations. For example, consider one or more types of wireline operations (see, e.g., FIG. 5) and/or one or more types of drilling operations (see, e.g., FIG. 1, FIG. 2, FIG. 4, FIG. 6). An example of such a tool in an operation is illustrated in FIG. 7.

FIG. 7 illustrates a rotary drilling rig system 705 that includes one or more tools for determination of attributes, while drilling. As shown, downhole measurements can be conducted by instruments (e.g., tools) disposed in a drill collar 720. Such measurements may be stored in memory of the downhole instruments, or may be telemetered to the surface via measurement-while-drilling telemetering. A MWD tool sub, schematically illustrated as tool 729, can receive signals from instruments of the drill collar 720, and optionally store and/or telemeters them to surface instrumentation 707 (e.g., via a pressure sensor 714 in a stand pipe 715, via wire, etc.).

In FIG. 7, a drilling rig 705 includes a motor 702 which turns a kelly 703 by means of a rotary table 704. A drillstring 706 includes sections of drill pipe connected end-to-end to the kelly and turned thereby. A plurality of drill collars such as collars 726 and 728 and collar 720 (e.g., as including a tool or tools), as well as one or more MWD tools 729 are attached to the drillstring 706. Such collars and tool form part of an assembly (e.g., above the drilling bit 730).

As the drillstring 706 and the bottom hole assembly turn, the drill bit 730 bores the borehole 709. An annulus 710 is defined between the outside of the drillstring 706 and bottom hole assembly and the borehole 709 through earth formations 732.

Drilling fluid or "mud" can be forced by pump 711 from mud pit 713 via stand pipe 715 and revolving injector head 717 through the hollow center of kelly 703 and drillstring 706 to the bit 730. Such mud acts to lubricate drill bit 730 and to carry borehole cuttings or chips upwardly to the surface via annulus 710. The mud is returned to mud pit 713 where it is separated from borehole cuttings and the like, degassed, and returned for application.

The tool 720 can include at least one ultrasonic transceiver 745 (see also, e.g., a second transceiver 746 placed diametrically opposed from the first) for measuring characteristics of the borehole while it is being drilled.

Such measurements can be conducted while the borehole is being drilled, but they may be made with the drill string and the bottom hole assembly in the borehole while the bit, bottom hole assembly and drill string are not turning. Such measurements may even be conducted while the entire string, bottom hole assembly and bit are being tripped to and from the bottom of the borehole (e.g., sliding or translating). As mentioned above, such characteristics of the borehole 709 may be telemetered to the surface via MWD telemetering tool 729 and the internal mud passage of drillstring 706, or they may be recorded and stored downhole and read out at the surface after the drillstring 706 has been removed from the borehole. As an example, where a drillstring includes circuitry downhole for purposes of guiding drilling (e.g., RSS, etc.), the tool 720 can include one or more interfaces that can receive and/or transmit information to such circuitry. As an example, the tool 720 can be included in one or more downhole control processes, for example, consider a directional drilling process that utilizes a downhole controller that is installed in a drillstring. As an example, control can be closed-loop or open-loop and may be downhole and/or involving surface equipment.

In the example of FIG. 7, the transceivers 745, 746 can be mounted on stabilizer fins 727 of the collar 720 or may be mounted in the cylindrical wall 723 of the collar 720' as illustrated in the inset of FIG. 7. As an example, such transceivers 745, 746 may be mounted on a cylindrical collar that does or does not include one or more stabilizing fins (e.g., or other stabilizing component).

Electronic circuits and microprocessors, memories, etc. used to control transceivers 745, 746, receive data from them, and process and store such data are may be mounted on a sleeve 721 which is secured within the collar 720 or the collar 720'. Such a sleeve can include a path 740' by which drilling mud may pass through the interior of drillstring 706 to the interior of bit 730.

The tools (e.g., as implemented as collars) 720 or 720' including transceivers 745 and 746 and the electrical components mounted on the sleeve 721 can be adapted to emit pulses and receive echoes and, for example, determine one or more attributes (e.g., locally), which can involve filtering and/or other signal processing.

As an example, a tool can measure characteristics of returning mud as may be flowing in an annulus, for example, via one or more of acoustic wave propagation velocity and acoustic attenuation. The velocity can be used to convert echo traveling time to distance. The measurement may be utilized to determine or indicate a gas influx.

As an example, a transceiver can be disposed in a steel cup secured within a cavity of a cylindrical wall of a collar or stabilizer fin of collar. As an example, a transceiver may be installed directly into a cavity of a collar.

As an example, a sensor of a transceiver can be a piezo-electric disk that may be a flat circular slice of ceramic material. Such a disk can be mounted between one (or more) impedance matching layer and a suitable absorbing or backing element. A matching layer may be fabricated of a low density material such as titanium or hard plastic. As an example, a backing element can include high impedance grains (e.g., tungsten, lead balls, etc.) molded in low impedance material (e.g., epoxy, rubber, etc.).

A ceramic disk, a matching layer and a backing element can be referred to as a sensor stack. These components can cooperate to generate and/or emit an ultrasonic pulse outwardly toward a wall of the borehole 709 through drilling mud of the annulus 710 and to receive sonic echo pulses which are reflected back to ceramic disk or sensor.

The sensor stack can be encapsulated, for example, in a rubber jacket, hard plastic package or metal cup, which isolates the sensor stack from high pressure drilling fluid in an annulus. Such fluid isolation can help to protect against electrical shorting and corrosion of the sensor stack elements and provides electrical insulation of electrodes, leads, and connections to the sensor disk.

A space between a jacket, backing material, and a cup can be filled with a highly deformable material such as rubber (e.g., natural and/or synthetic) or fluid (e.g. high insulation oil). Such rubber and the rubber jacket cooperate to surround the sensor stack with rubber in order to dampen noise transmitted in a collar from a drilling process, and to absorb some amount of high shock forces on the sensor stack created during a downhole drilling operation. The highly deformable material may function to allow the sensor stack to move or deform under pressure or due to thermal expansion.

Electrical leads can be connected between outer and inner surfaces of a sensor and terminals of electronics. Such leads may run through a rubber or resin portion and through a cup.

As to noise features, a ring of low impedance material may be placed about a rubber jacket or plastic package in longitudinal alignment a sensor disk. Such a ring (e.g., made of material(s) such as epoxy, rubber, plastic and the like, (or even grease or mud)) can help to reduce the level of high frequency noise transmitted through a collar (e.g., metal, alloy, etc.) that reaches the disk. A ring may reflect some amount of noise transmitted through a drillstring and collar which could reach a ceramic disk. As an example, one or more components may act as mechanical high frequency noise insulators (e.g., and/or mechanical filters) so as to increase the signal to noise performance of one or more transceivers.

A delay-line may be placed outwardly of a sensor disk. Such a delay-line may provide mechanical protection to a sensor stack as well as providing an role in the measurement of drilling fluid sonic impedance. Measurement of drilling fluid sonic impedance provides a way to determine one or more attributes, which may be germane to gas influx detection, etc. A delay-line 70 may also facilitates short standoff detection of the borehole.

A delay-line may be fabricated of low acoustic impedance materials such as plastic, epoxy or rubber. It may act to distribute impact forces on its outer face over a relatively wide area inwardly toward a matching layer. A delay-line, rubber jacket and matching layer may cooperate to broadly distribute such impact forces, which can help to protect a ceramic disk, which tends to be fabricated of an inherently brittle material. A delay line may be mounted with respect to a cup so as to isolate a sensor stack from torque caused by an outer face of the delay-line and a collar rubbing against a borehole when a drillstring or drillstring component is turning in the borehole. A delay-line can help to protect a rubber jacket from damage due to banging and scraping of a tool against a wall of a borehole.

A delay-line can be resiliently mounted (e.g., spring mounted) within a cup by one or more components (e.g., springs, etc.), which can maintain contact between the delay-line and a rubber jacket, for example, even if a sensor stack moves outwardly or inwardly due to expansion or contraction with temperature and pressure variations.

As an example, a tool can include various features of a tool such as one or more tools described in U.S. Pat. No. 5,354,956 A, which is entitled "Ultrasonic measurement apparatus", to Orban et al., which is incorporated by reference herein.

As explained, a tool can include components that can be utilized for multi-frequency analyses such as multiple band analyses. As an example, a tool can include decision circuitry that operates to select a band and/or to process a band for analysis. For example, consider circuitry that can determine particular aspects that may be beneficial and/or detrimental as to data within a band. In such an approach, where conditions exist that make a particular band less reliable, for example, as may be characterized by a signal to noise ratio, the circuitry can select a different band, which may be expected to be (e.g., or demonstrated to be via sensed or determined condition(s)) more reliable (e.g., a higher signal to noise ratio (SNR)). As an example, a tool can be a dynamic band-selective tool that can select one or more bands for purposes of generating attribute values. As an example, one or more of such attribute values may be utilized in one or more control schemes that control one or more pieces of field equipment. As mentioned, drilling can depend on various conditions where a goal may be to reach a target with minimal NPT and with appropriate borehole characteristics (e.g., stability, etc.). In such an example, a tool can select one or more bands for generating one or more attributes that can be utilized in a drilling operation (e.g., via surface and/or downhole control of one or more pieces of equipment).

As mentioned, ultrasonic pulse-echo imaging finds use in oil and gas exploration and production. Ultrasonic pulse-echo imaging is a technique that can interrogate a wellbore surface for acoustic reflectivity and geometry, by scanning an ultrasonic transducer over a wellbore surface while a downhole tool is rotating and moving along wellbore axis (or while tripping and/or while stationary). An ultrasonic transducer can be mounted on a tool in such a way that it faces toward wellbore surface. The transducer can be controlled to excite an acoustic pulse, that propagates, that reflects (e.g., a wellbore and fluid interface, etc.) and that is received as a reflected pulse, which can be referred to as an echo, of which attributes (e.g., amplitude and travel time, etc.) can provide acoustic reflectivity and high spatial resolution caliper or borehole shape. One or more attributes may be mapped into a multi-dimensional image of azimuth-depth plane (e.g., 2D) and used for geology, geomechanics and petrophysical interpretation purposes. As an example, time may be a dimension where changes in time may be determined (e.g., as to dynamic downhole phenomenon).

Echo amplitude changes in response to changes in acoustic properties of wellbore (for example, in open hole, acoustic impedance of formation) and associated texture and geometrical changes. Travel time can be used to compute standoff (or distance between the transducer and wellbore surface) using acoustic wave propagation speed in well fluid, either measured or calculated based on fluid composition and environmental conditions (e.g., pressure and temperature). From standoff and known transducer mounting diameter, wellbore diameter and cross section shape can be reconstructed.

For downhole imaging in attenuative drilling mud, the echo amplitude sensitively varies as a function of traveling distance and frequency. As an example, acoustic signal attenuation rate or logarithmic amplitude reduction in unit distance (often presented in decibel per centimeter) can be linearly proportional to frequency.

Ultrasonic imaging finds use in wireline applications. For wireline operations, a tool operator can select frequency band of excitation, ranging excitation center frequency, for example as 250 kHz or 500 kHz, depending on well fluid attenuation and borehole conditions (such as in-gauge or over-gauged, or smooth and rough surfaces). However, for LWD applications, such interactive frequency selection can be relatively complicated and hence not readily made or not possible to make. Various examples of tools described herein can include circuitry and techniques that can facilitate making such decisions, optionally in an automated manner such that a tool "knows" what band or bands of frequencies may provide for attributes (e.g., or improved attributes). Such a tool may be an intelligent tool in that it can respond to conditions in real-time to optimally select and/or process one or more bands. As explained, wireline conditions can be less complicated than drilling conditions, as drilling involves making a product such as a borehole in the Earth. Wireline can be performed by itself without complications, conditions, etc., involved in drilling operations. As explained, wireline operations can include surface equipment that is in communication with one or more downhole tools to make decisions, control, etc. As an example, while wireline operations may be generally less complex or faced with fewer issues, one or more examples of tools described herein may be utilized in one or more wireline operations. For example, an intelligent tool may operate dynamically, optionally without surface intervention as to one or more bands being selected and/or processed in a manner that can optimize generation of one or more attributes under particular conditions (e.g., fluid, formation, borehole, movement of equipment, etc.). Such an intelligent tool may be useful in one or more types of tool operations (such as coiled tubing, thrubit or through bit, etc.) including wireline, optionally with limited human or skilled tool operator interventions.

As an example, to provide high resolution borehole imagery, high frequency excitation (for examples, at central frequency from 350 to 500 kHz, which does not limit to operate in different frequency band than this example) may be utilized because such an ultrasonic pulse can interrogate a borehole surface in a manner where the pulse tends to be well-collimated. Such an approach can be suitable for detection of relatively small or fine borehole features, which may be understood as to "small" and "fine" in relationship to frequency. For example, a longer wavelength (lower frequency) tends to provide less spatial resolution than a shorter wavelength (higher frequency). Thus, terms such as "small" and "fine" can be understood with respect to an ability to resolve a feature or features in a manner that depends on wavelength, which is related to frequency. Further, where energy passes through a material and/or encounters an interface, attenuation can occur, which can be related to frequency. Longer wavelengths may attenuate less than shorter wavelengths.

As an example, attenuative mud, such as oil-base mud with heavy weighting agent with viscosifier, can reduce echo amplitude beyond electrical and mechanical noise such that echo detection and/or analysis thereof is confounded, which can result in unreliable travel time and caliper measurements (e.g., unreliable attribute values).

Another example of a while drilling echo detection challenge is perturbation of echo signal detection caused by formation debris and cuttings in drilling fluid. Relatively large (e.g., above quarter wavelength of ultrasonic pulse at operating frequency) cuttings sometimes reduce echo amplitude appreciably, for example of the order of larger than 30 percent or more of echo amplitude without cuttings. To characterize formation acoustic impedance quantitatively utilizing echo amplitude, such cutting perturbation reduces reliability of the formation reflectivity measurement.

To improve measurements in drilling mud under various conditions, including while drilling, lower frequency may be beneficial compared to higher frequency. For example, consider operating with a frequency (e.g., center frequency) that is within a range of approximately 100 kHz to approximately 300 kHz; noting that one or more other values may be utilized (e.g., less than 100 kHz and/or greater than 300 kHz). As an example, a band can be within such a range or may extend beyond the range.

As an example, to realize high resolution borehole imaging and robust caliper minimizing cutting and mud attenuation challenges without human intervention, a tool controller system and downhole can include components that operate as follows:

1) excite a transducer in wide frequency band within an interested frequency range, for example, 50 kHz to 1 MHz;
2) apply digital filtering using downhole data processor (e.g., consider a Field-Programmable Gate Arrays (FPGA) and/or a Digital Signal Processor (DSP)) to echo waveforms in frequency band of multiple (equal or larger than one) central frequencies, for example, 125 and 375 kHz, before extracting echo attributes, and
3) compute and save the attributes to downhole memory.

As an example, a tool controller can include circuitry that monitors echo amplitude and travel time at multiple frequencies and can select reliable data observing pre-selected echo attributes as reliability flags.

As an example, a flagging criterion can be associated with echo amplitude. For example, when echo amplitude is lower than measurement noise (e.g., due to electronics and/or mechanical shock/vibrations), quantitative characterization of echo data can be deemed to be challenging and unreliable.

As an example, a method can include, based on laboratory or field experimental data, setting one or more reliability thresholds of echo amplitude, for example, consider an approach that sets thresholds with respect to two different frequencies. For example, consider respectively A1 and A2 where, when high and low frequency echo amplitude is respectively lower and larger than A1 and A2, high frequency travel time determined to be not reliable but lower frequency travel time is determined to be reliable (e.g., relatively). In such an approach, when the high frequency echo amplitude is lower than A1, high frequency caliper (or travel time) can be rejected and components can use low frequency caliper (or travel time) as alternative measurements.

As an example, a tool controller can be configured to use more than one central frequency, for example, consider one or more of 500, 375, 250 and 125 kHz or a combination or combinations thereof.

As an example, a tool may operate according to a high frequency and a low frequency (e.g., a two frequency logic scheme). As an example, two frequencies (e.g., high and low) in combination can be sufficient for providing high resolution amplitude and caliper images and low resolution but robust image and caliper.

As an example, a selection of a central frequency and filtering band width can be pre-set, selected and/or dynamically determined. As to pre-set, consider values such as 125 kHz or/and 250 kHz. As an example, a central frequency and band width can be of desired values, which as above, may be pre-set, selected and/or dynamically determined. As an example, one or more bandpass filters can be designed as windowed finite duration of sinusoid, following digital signal processing techniques.

As an example, selectable bandpass filtering can be designed using electronic circuits that may be equipped with switches/multiplexers and analog filter circuitry.

As an example, a tool can include one or more DSP integrated chips (ICs) that can be operatively coupled to one or more other components for purposes of processing signals as to control and/or attribute generation (e.g., and/or control). DSP may provide for flexibility of programmable parameter selection without augmenting numbers of electronics components, which can help improve hardware reliability under harsh drilling environment under high shock and vibration under high temperature. Such an approach may also act to conserve power, which may be via a local power source. As an example, a single low-power DSP IC may be included in a tool or, for example, a plurality may be included. For example, consider DSP ICs that can be operated in parallel and/or in series. In such an approach, one or more DSP ICs may be utilized in analyzing signals for purposes of dynamic control of themselves and/or one or more other DSP ICs. As an example, with respect to bandpass, one may operate as a lowpass and another may operate as a highpass. As an example, one or more can operate as bandpass filters for purposes of a high central frequency and for purposes of a low central frequency. Various combinations can be included in a tool, where functions and outputs may be dynamically determined, assigned, etc.

DSPs (e.g., DSP ICs) can reduce errors as may be associated with passive component fluctuations over time and temperature, op amp drift (active filters), etc. DSPs can be capable of performance specifications that would, at best, be difficult to achieve with an analog implementation. As mentioned, characteristics of a DSP may be changed via control. As an example, a method can include determining and/or characterizing desired filter responses such that filter parameters can be computed. Characteristics such as amplitude and phase response may be derived in a similar fashion. As to analog filters, parameters can include resistor, capacitor, and inductor values; whereas, for example, coefficient values may be calculated for a digital filter. As an example, values may in a memory of a DSP or circuitry accessible to a DSP as filter coefficients that can be used with sampled data values from an ADC to perform filter calculations.

As an example, a real-time digital filter (e.g., utilizing a discrete time function) can operate on digitized data (e.g., from an ADC that converts a continuous waveform, etc.). As an example, a new data point can be acquired each sampling period. Because of this discrete nature, data samples can be referenced as numbers such as sample 1, sample 2, sample 3, etc. As an example, a waveform can be digitized with an ADC to produce samples x(n). These data values can be fed to a digital filter where output data samples, y(n) can be used to "reconstruct" an analog waveform if desired (e.g., using a low glitch DAC, etc.).

For real-time operation, a DSP can execute various steps in a filter routine within one sampling clock period, 1/f s. A fast general purpose fixed-point DSP such as the ADSP-2189M at 75 MIPS can execute a complete filter tap multiply-accumulate instruction in 13.3 ns. The ADSP-2189M requires N+5 instructions for an N-tap filter. For a 100-tap filter, the total execution time is approximately 1.4 μs. This corresponds to a maximum possible sampling frequency of 714 kHz, thereby limiting the upper signal bandwidth to a few hundred kHz. Other types of DSPs may include components that allow for higher upper signal bandwidths.

As an example, a DSP can include one or more features of the Linear Technology, LTC6602, which includes specifications:
Matched Dual Filter/Driver
Phase Matching to Within 2 Degrees
Gain Matching to Within 0.2 dB
Configurable as Lowpass or Bandpass:
  Programmable 5th Order Lowpass: 42 kHz to 900 kHz
  Programmable 4th Order Highpass: 4.2 kHz to 90 kHz
Programmable Gain: 1×, 4×, 16×, 32×
Pin Programming or SPI Interface
Low Noise: −145 dBm/Hz (Input Referred)
Low Distortion: −75 dBc at 200 kHz
Differential, Rail-to-Rail Inputs and Outputs
Input Range Extends from 0 V to 5 V
Low Voltage Operation: 2.7 V to 3.6 V
Shutdown Mode
4 mm×4 mm QFN Package As another example, a DSP can include one or more features of the Linear Technology LTC1560-1:
5th Order, 1 MHz Elliptic Filter in SO-8 Package
Pin Selectable 1 MHz/500 kHz Cutoff Frequency
Signal-to-Noise Ratio (SNR): 75 dB
Signal-to-Noise Ratio with −63 dB THD: 69 dB
Passband Ripple (fCUTOFF=1 MHz): +0.3 dB
Stopband Attenuation Better Than 60 dB As another example, a DSP can include one or more features of the Linear Technology LTC1562-2:
Continuous Time—No Clock
Four 2nd Order Filter Sections, 20 kHz to 300 kHz Center Frequency
Butterworth, Chebyshev, Elliptic or Equiripple Delay Response
Lowpass, Bandpass, Highpass Responses
99 dB S/N, ±5 V Supply (Q=1)
93 dB S/N, Single 5 V Supply (Q=1)
Rail-to-Rail Input and Output Voltages
DC Accurate to 3 mV
±0.5% Center Frequency Accuracy
"Zero-Power" Shutdown Mode
Single or Dual Supply, 5 V to 10 V Total
Resistor-Programmable fO, Q, Gain As another example, a DSP can include one or more features of the Linear Technology LT1568:
Up to 10 MHz Center Frequency on a Single 3 V Supply
A Single Resistor Value Sets Lowpass Cutoff Frequency (200 kHz<fC<5 MHz), Unequal Resistor Values Extend Cutoff Frequency Up to 10 MHz
Flexible Different Resistor Values for Lowpass Transfer Functions with or Without Gain
SNR=92 dB (fC=2 MHz, 2VP-P)
THD=−84 dB (fC=2 MHz, 1VP-P)
Internal Capacitors Trimmed to ±0.75%
Single 4-Pole Lowpass Filter or Matched Pair of 2-Pole Lowpass Filters
Connectable as a Bandpass Filter
Single-Ended or Differential Output
Operable from Single 3 V (2.7 V Min) to ±5 V Supply
Rail-to-Rail Input and Output Voltages As mentioned, one or more DSPs may be utilized, which may provide for sequential processing to achieve a desired bandpass range, and/or which may be utilized themselves as bandpass filters, as appropriate.

Various examples of equipment and techniques are described herein pertaining to ultrasonic pulse-echo measurements that can be made in one or more multi-frequency bands, which may be determined, selected, etc., optionally dynamically in a downhole environment, optionally during drilling and/or during tripping, etc., of a drillstring. As an example, multi-frequency measurements may be applicable to both in-situ real-time and recorded or memory mode measurements.

As an example, a workflow can include ultrasonic pulse-echo imaging of a logging-while-drilling (LWD) operation and/or, for example, one or more other types of operations (e.g., logging, wireline, coiled tubing or through bit, or different measurement methods, such as pitch-catch).

As mentioned, FIG. 7 shows an example of a LWD logging system and downhole tool, and ultrasonic transducer mounting method.

Figure 8A:
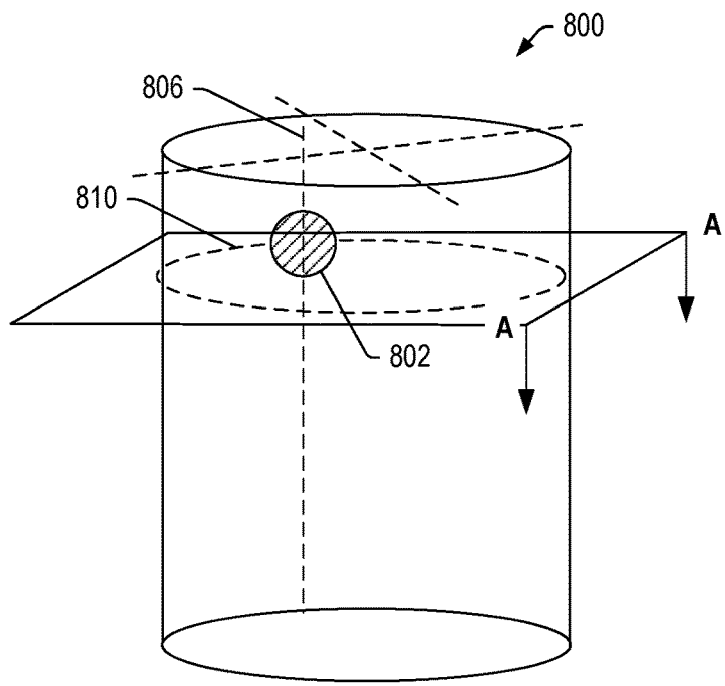
FIGS. 8A and 8B illustrates examples of equipment.
Figure 8B:
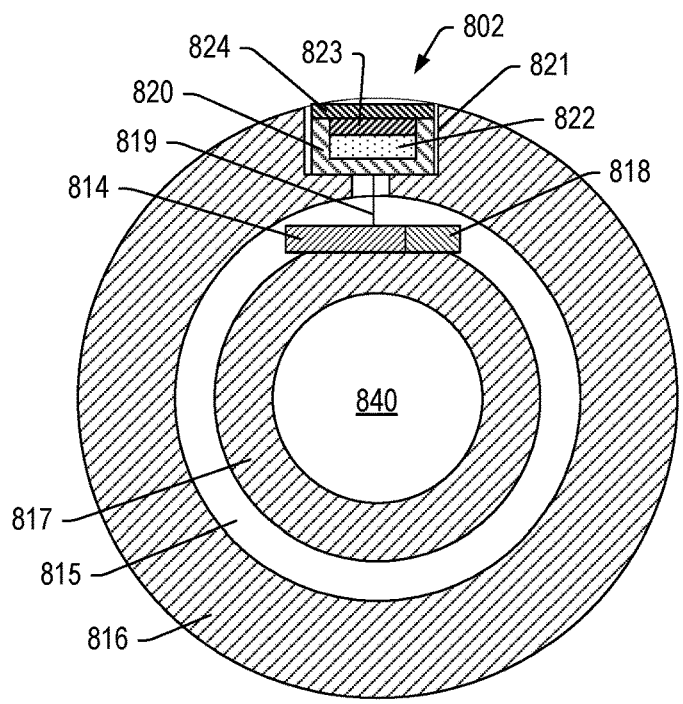

FIGS. 8A and 8B show a schematic view of an example implementation of a transducer mounting section 800 of an ultrasonic tool and a cross-sectional view of the transducer mounting section 800 along a plane A-A. The transducer mounting section 800 can include a pulse-echo transducer 802 that can be oriented toward a wall of a wellbore at a respective azimuths 808 and axial location 810. The plane indicated by the line A-A is through the axial location 810 and bisects the transducer 802. The transducer 802 can be connected to data acquisition and storage electronics 814 (e.g., and/or other electronics) in an electronics section 815 inside a collar 816 of the ultrasonic tool. An inner tube 817 (e.g., and/or portion of the collar 816) can define an internal mud passage 840.

As an example, the electronics 814 can provide magnetic orientation at the time of ultrasonic measurements using a magnetometer 818. The transducer 802 shown in the example of FIG. 8B is depicted as a simplified structure of a pulse-echo transducer that includes a metal bulkhead feed through connector 819, a metal housing 820 in an outer recess 821 of the collar 816, a backing 822, a piezo-element 823, and a front-face protective window 824.

Figure 9:
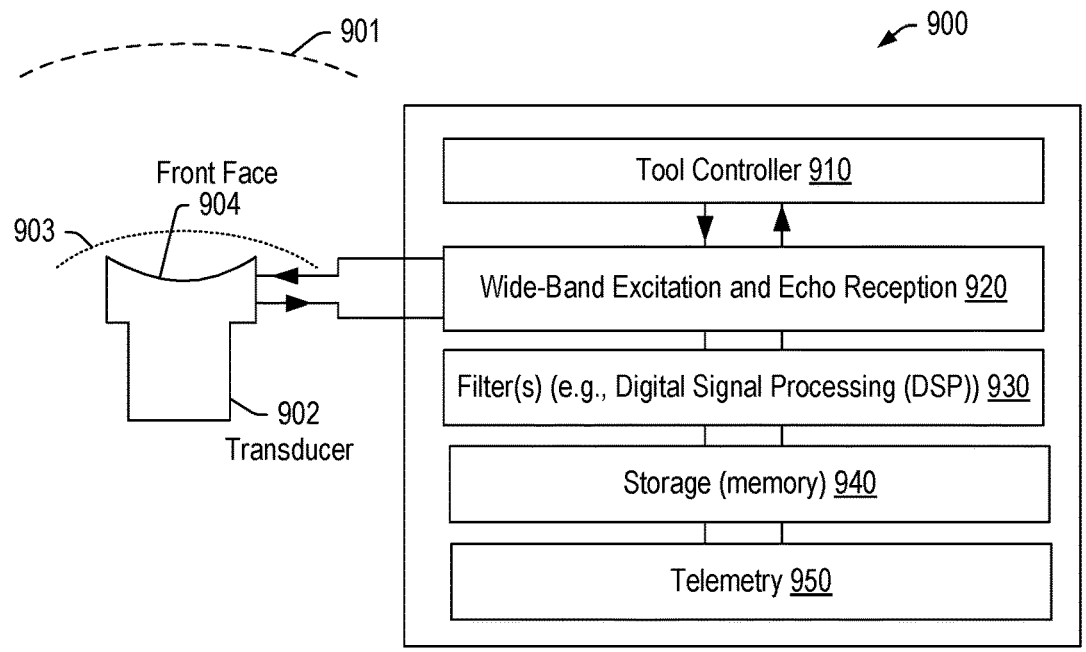
FIG. 9 illustrates an example of a downhole tool system and examples of graphics.
Figure 9:
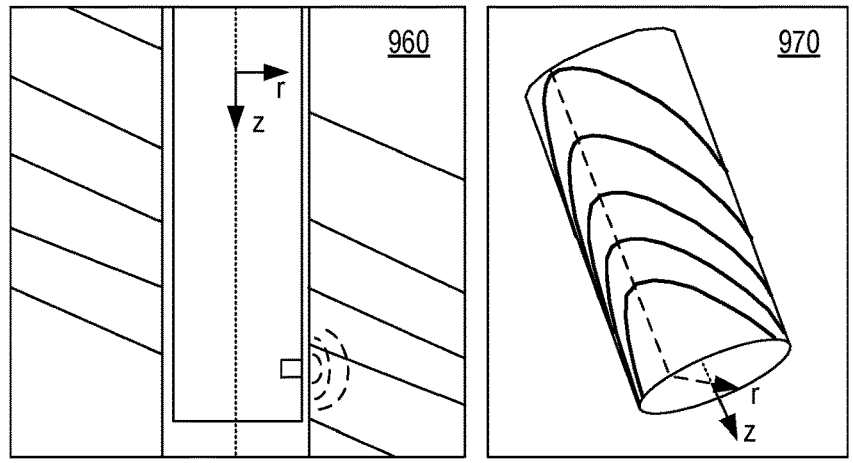
Figure 9:
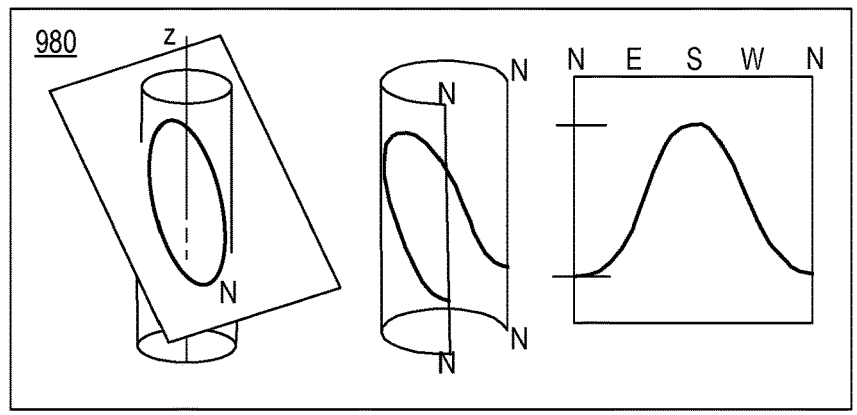

FIG. 9 shows a measurement system 900 and various graphics 960, 970 and 980 that correspond to tool, borehole and formation orientations and how results may be rendered (e.g., to a display, etc.).

As shown, the measurement system 900 that can be include or be operatively coupled to a transducer 902 including a front face 904 where the measurement system 900 can include a tool controller 910 (e.g., a downhole system such as an electronic control system, etc.), a wide-band excitation and echo reception unit 920, a filter(s) unit 930 (e.g., a DSP unit, etc.), memory 940 and telemetry unit 950; noting that the filter(s) unit 930 may include one or more DSP ICs. As shown, various components are included where the excitation and reception unit (e.g., component or components thereof) are operatively coupled to one or more transducers (e.g., transceivers) that can include an orientation as indicated by a front face (see, e.g., the front face 904 of the transducer 902). The components in the example of FIG. 9 can be included in a tool or tools, which may be operatively coupled. For example, a sub can include electronics for processing and/or control while another sub can include one or more transducers.

As an example, the system 900 can be a downhole tool that includes the unit 920 as an ultrasonic energy emitter and echo receiver that receives echo data responsive to ultrasonic energy emissions; includes the filter(s) unit 930 as a plurality of filters configured to perform bandpass filtering of the echo data at one or more different central frequencies to generate filtered data; includes the telemetry unit 950 as telemetry circuitry; and includes the tool controller 910 as a downhole system that controls the ultrasonic energy emitter and echo receiver unit 920, controls a plurality of filters of the filter(s) unit 930, controls extraction of attributes of bandpass filtered echo data (e.g., using filtered data, for example, using one or more types of circuitry, which may be DSP circuitry, etc.), controls storage of the attributes in the memory 940, and controls transmission of at least a portion of the attributes via the telemetry unit 950. In such an example, attributes (e.g., attribute values, etc.) can be generated downhole and transmitted using telemetry to surface equipment and/or to one or more other downhole tools. For example, consider transmission of attribute values from an ultrasonic downhole measurement tool to another measurement tool and/or a drilling tool (e.g., a directional drilling tool, a mud-motor, etc.). In such an example, one or more attribute values can be utilized to convey information to another tool for control of the tool (e.g., directional drilling, bit speed, etc.).

A tool controller can, for example, be configured to control downhole electronics and ultrasonic data acquisition and processing units. A wide-band excitation and echo reception unit can be an electronics system, with or without embedded software, to excite and receive signals from ultrasonic one for more pulse-echo transducers.

As an example, a received signal may be amplified or/and filtered before applying analog to digital conversion (ADC).

As an example, digitized signals can be transmitted to one or more DSPs, which may include FPGA or/and DSP circuitry. Digitized raw echo signals may be pre-processed for reducing noise such as electrical, transducer internal ring-down and mechanical, before applying further filtering and echo attributes extraction in multiple different frequency band.

A multiple different frequency band attribute extraction can be done by applying bandpass filters (e.g., wholly or individual low/highpass) that can include parameters of central frequency f, pass band frequency Y at which filtered signal magnitude is X decibel lower than that at the central frequency.

The graphic 960 shows an approximate view of a tool in a borehole of a formation where the formation includes layers that are not normal to an axis of the borehole. The graphic 970 shows a cylinder surface representation of the layers, for example, as may be seen on a core sample (e.g., a cylinder cut from a formation). The graphic 970 also shows a dashed line, which may correspond to a direction such as, for example, north. The graphic 980 shows how a cylinder surface representation of a layer of a formation (e.g., an interface, etc.) can be unrolled to provide a flat, 2D view of the layer.

As shown, if a cylindrical surface of data is cut along a longitudinal line running from north downhole to north uphole, the cylindrical surface data may be presented in a 2D format by "unrolling the cylinder". The image thus created can be a representation of the plane's intersection with the cylinder displayed versus azimuthal direction or angle (e.g., 0 to 360 or N to E to S to W to N). In the "unrolled cylinder" 2D format, the plane that intersects the cylinder appears as a sinusoidal curve. In the example of FIG. 9, the peak of the sinusoidal curve is at the direction south (S). Given the diameter of cylinder (e.g., or borehole), the sinusoidal curve may be characterized as having a distance (e.g., circumference) from north to east to south to west to north.

In the example of FIG. 9, acquired data indicative of material at and/or adjacent the borehole may likewise appear in a sinusoidal manner. Where multiple planes (e.g., bedding planes) intersect a borehole, the entire image may be composed of multiple sinusoids, which, for example, may or may not be parallel (e.g., consider non-parallel planes).

As an example, a log from an ultrasonic borehole tool can be presented using such as north, south, east, west, uphole, downhole, etc., across with respect to depth such as in the 2D format of the graphic 980 of FIG. 9. Such a log can utilize, for example, amplitude or another metric. Such a log may be compared to one or more other types of logs for analysis (e.g., resistivity, other imaging techniques, etc.). As an example, an image and/or a graphic may be a diagraph, where diagraphy concerns logging (e.g., "dia" as continuous and "graphy" as drawing).

Figure 10:
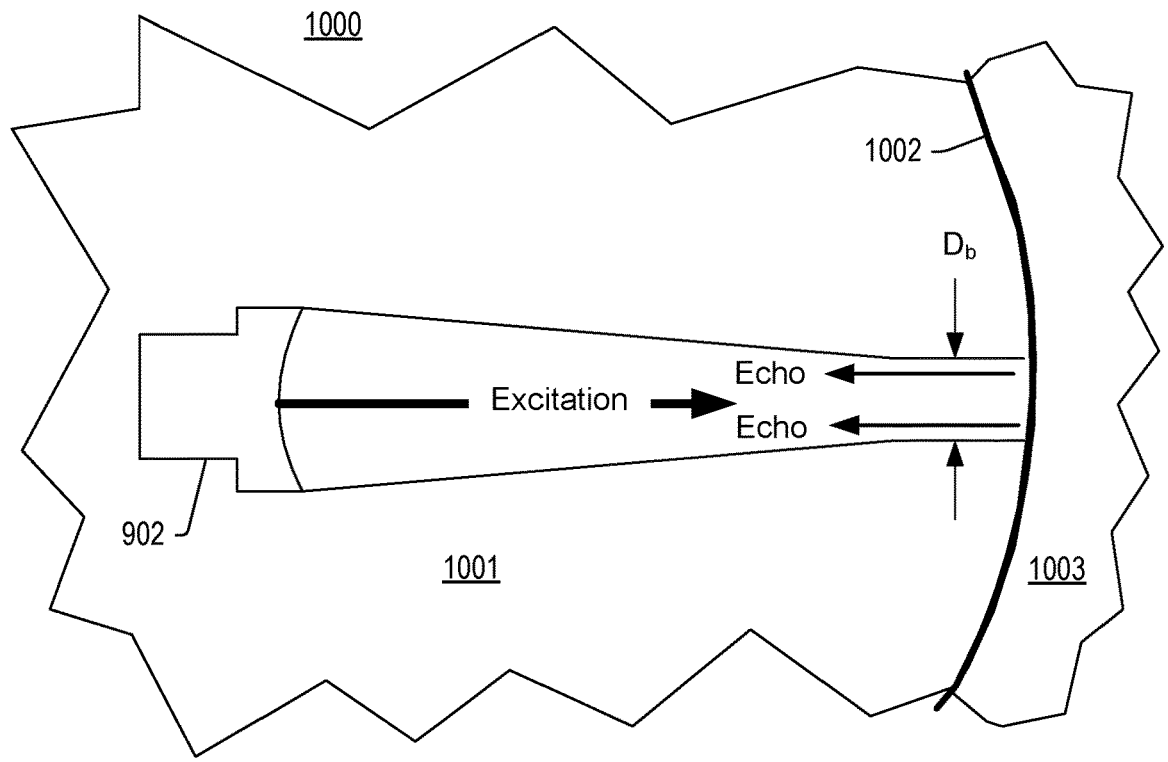
FIG. 10 illustrates an example of a process.
Figure 10:
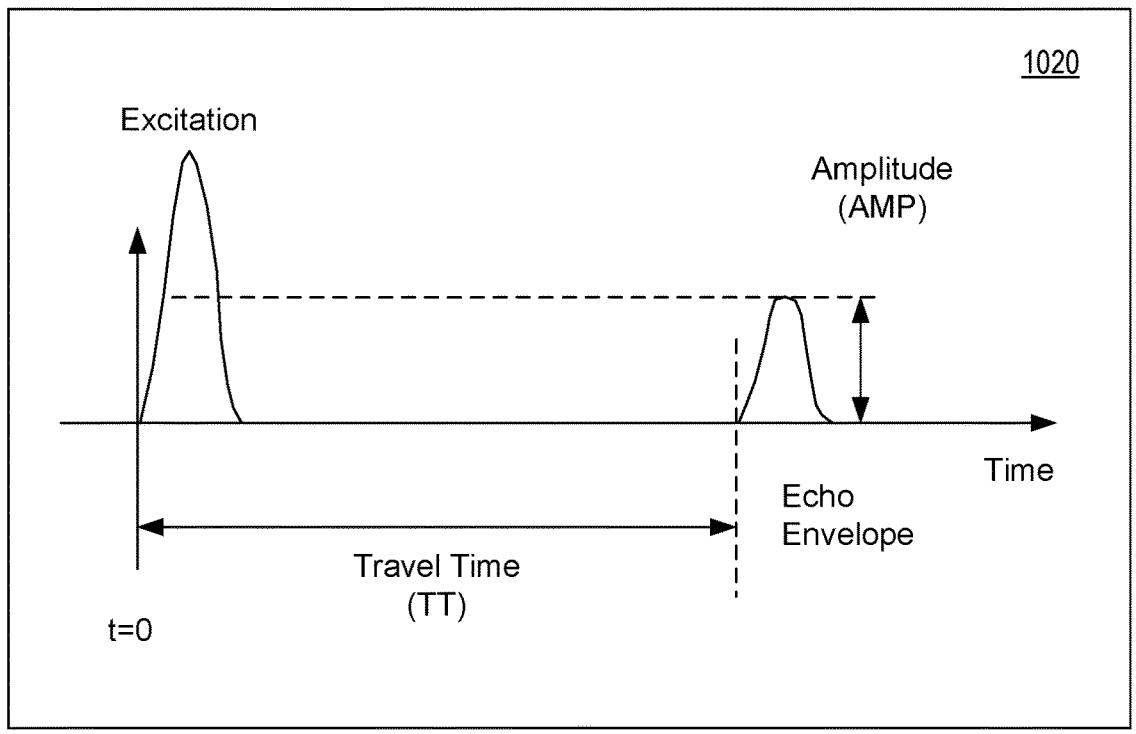

FIG. 10 shows a schematic of echo attributes 1000 with respect to a transducer 902 in a downhole environment with fluid 1001 (e.g., well fluid, drilling mud, etc.) where a borehole wall 1002 defines an interface with respect to a formation 1003. In the example of FIG. 10, a plot 1020 is shown as to amplitude and travel time. In FIG. 10, ultrasonic energy is emitted by the transducer 902 as excitation energy toward the borehole wall 1002 where a beam width or beam diameter ($D_b$) can be defined. In response, echo energy can be returned to the transducer 902. In the plot 1020, amplitude of the excitation energy and echo envelope energy are illustrated where, with respect to the transducer 902, a travel time can be defined (see, e.g., TT).

As an example, ultrasonic pulse-echo measurements can be performed while a tool is conveyed in a borehole where such measurements can be analyzed to provide various types of information. As an example, a transducer can be operated in a transceiver mode. In such an example, the transducer can excite an ultrasonic pulse, which propagates in well fluid (or drilling mud) and is reflected back to the transducer as an echo from the fluid and wellbore interface, where the transducer receives the echo (e.g., an echo envelope). In such an approach, the echo can be characteristic of material or materials through which energy passes and/or is reflected.

As mentioned, FIG. 10 shows a parameter referred to as a beam diameter ($D_b$). As an example, such a parameter may be controllable, for example, by controlling a tool, a transmitter of a tool, circuitry operatively coupled to the transmitter of the tool, etc. As an example, a beam diameter may optionally be set or selected based at least in part on distance (e.g., standoff) to material (see, e.g., FIG. 13). As an example, a tool may provide for a range of frequency specific beam diameters. As explained with respect to FIG. 14, different frequencies can provide for different resolutions, types of attributes, etc.

In the plot 1020, FIG. 10 shows a graphical representation of an excitation envelope and an echo envelope, each with a corresponding shape as to amplitude versus time where a travel time (TT) may be determined (e.g., using a criterion or criteria as to amplitude, etc.).

As an example, a tool acquisition system can record data, after processing signals using analog and/or digital circuitry, for example, consider filtering and amplification, and applying a Hilbert transformation, before extracting echo envelope amplitude and travel time (TT).

Various examples of echo signal acquisition and processing techniques are described in SPE-28440-PS "Improved Borehole Imaging by Ultrasonics", Hayman et al. (1998), which is incorporated by reference herein. Hayman provides a description of acoustics of pulse-echo measurements, hardware and echo signal acquisition and processing along with histogram equalization and image enhancement methods. Various aspects of pulse-echo signals as include indicia of various physical conditions (e.g., attributes, etc.) are described in US 2014/0204700 A1, entitled "Automatic processing of ultrasonic data", Valero et al., which is incorporated by reference herein.

As an example, one or more additional attributes of an echo, such as frequency and phase angle, can be extracted as a result of data processing, which may include wavelet transformation and model signal fitting.

As an example, raw waveforms of echo signals may be recorded and stored in downhole memory, with and without data compression for post-processing at surface. Using a geometrically focused transducer, a transducer can interrogate a borehole property in an area represented by a beam diameter. As an example, a beam diameter at an imaging frequency may be in a range from approximately 4 mm to approximately 8 mm, for example, depending on standoff and a particular central frequency. For example, beam diameter can depend on frequency or range of frequencies utilized.

Figure 11:
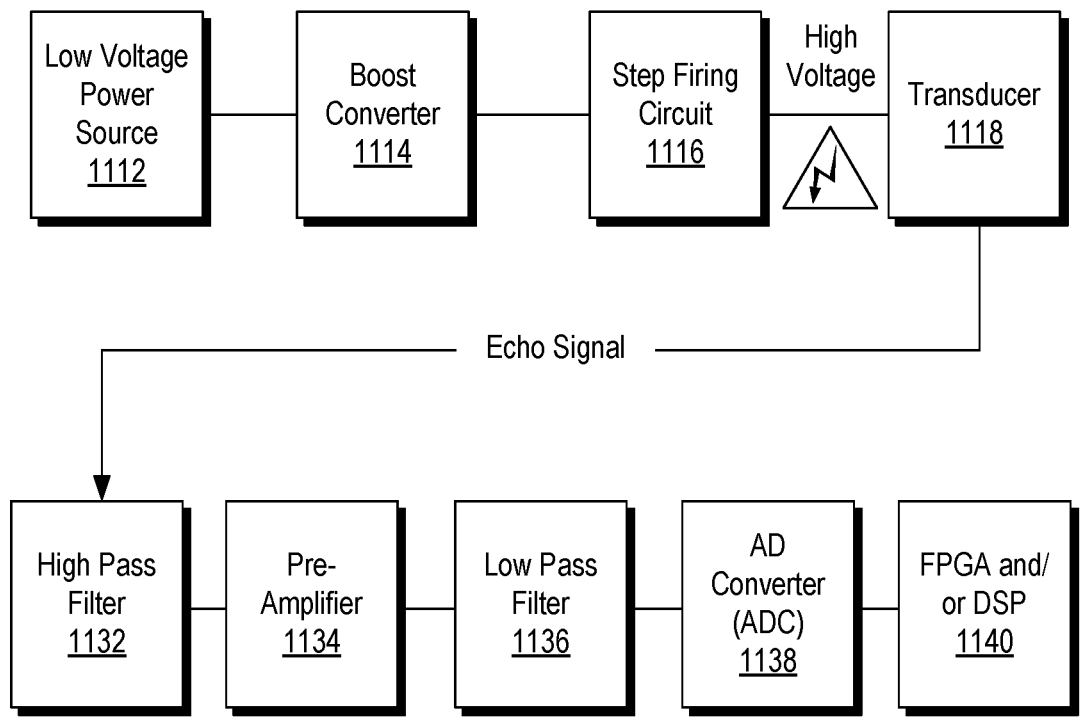
FIG. 11 illustrates an example of equipment.

FIG. 11 shows a diagram of an example ultrasonic pulse-echo transducer excitation and signal reception electronics 1100. As shown, the electronics 1100 can include a low voltage power source 1112, a boost converter 1114, and step firing circuitry 1116 that can generate high voltage output that can be directed outwardly by a transducer 1118. As explained, an echo signal can be generated in response to such an emission of energy (e.g., ultrasonic energy) where the echo signal may be received by the transducer 1118 and processed using a high pass filter 1132, a pre-amplifier 1134, and a low pass filter 1136. In the example of FIG. 11, the output of the low pass filter 1136 can be analog such that an analog to digital converter (ADC) 1138 can be utilized to generate digital output. Such digital output can then be processed using one or more types of circuitry 1140 such as, for example, FGPA circuitry and/or DSP circuitry.

As an example, an acoustic pressure pulse can be radiated (e.g., emitted) and received as an echo at a front face of an ultrasonic transducer, as can be made of piezoelectric material. In such an example, the received pulse may be amplified and filtered using various circuitry. A received signal can be transmitted to, for example, a digital signal processing unit (DSP). As an example, a low voltage power source can be utilized to cumulate energy in a boost converter for exciting a transducer using a step firing circuit to generate high voltage output, for example, consider a voltage larger than approximately 100 V and lower than approximately 1000 V. As an example, an excited pressure impulse, as emitted into well fluid, can insonify a formation wellbore surface and be reflected back to the transducer. A received echo can be converted to an electronics signal (or signals) by the transducer and filtered either before or after amplifying received echo signal(s). As mentioned, an echo signal can be received and converted into a digital representation (e.g., digital amplitude with respect to time, etc.).

Figure 12:
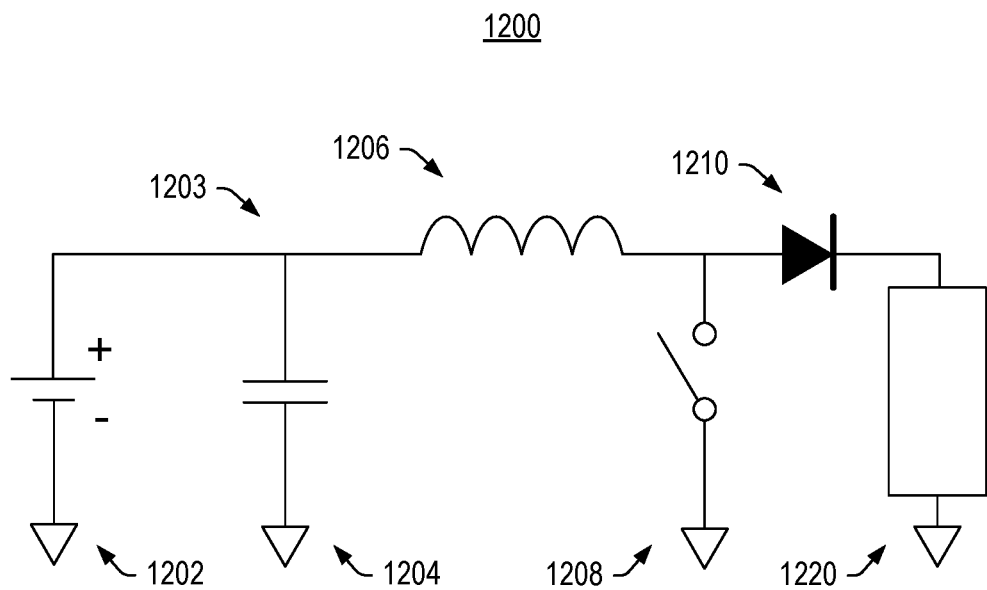
FIG. 12 illustrates an example of circuitry.

FIG. 12 shows an example circuit 1200 for wide-band and high voltage excitation, for example, as suitable to perform various actions as to components in the electronics 1100 of FIG. 11. In the example of FIG. 12, the circuit 1200 can include power circuitry 1202, LC circuitry 1203 (see, e.g., capacitor 1204 and inductor 1206), switching circuitry 1208, and a diode 1210, where output of the diode 1210 can be electronically coupled to a transducer 1220. In the example of FIG. 12, the power circuitry 1202 can include one or more batteries and/or one or more other sources of power. As mentioned, one or more batteries may be utilized to supply power such as DC power at a first voltage where the first voltage can be boosted to a second, higher voltage.

As an example, a wide-band firing circuit can be realized as a step-up (or down) or a half-cycle rectangular or a one cycle rectangular high voltage source in the order of available band width, for example, after normalizing peak value.

As one implementation example, the circuit 1200 can be a step-up high voltage circuit. For example, the LC circuitry 1203 and the switch circuitry 1208 (e.g., a MOS-FET or a transistor) can be utilized for such an approach. As an example, a switch of the switch circuitry 1208 can be in a closed state initially where an electric current can be driven by the power circuitry 1202 to flow into the inductor 1206 of the LC circuitry 1203 where energy can be stored during a period of time. When the switch of the switch circuitry 1208 is transitioned from a closed state (e.g., short) to an open state (as shown in FIG. 12), an electrical current can flow into the transducer 1220. Due to the nature of the inductor 1206 of the LC circuitry 1203, high voltage can be generated on the end of the inductor 1206 at the transducer side at the moment of opening the switch of the switch circuitry 1208. As shown, the diode 1210 can be present in the circuit 1200, for example, electrically between the inductor 1206 and the transducer 1220. As shown, the circuit 1200 can include one or more capacitors 1204 (e.g., consider LC circuitry).

As an example, a circuit, or circuits, can include a power source, one or more inductors, one or more switches and one or more transducers. As an example, circuit, or circuits, may include one or more diodes. As an example, a circuit, or circuits, may include one or more capacitors. As an example, a circuit or circuits may be tuned. As an example, a circuit or circuits may be utilized to store energy, which may include energy stored at one or more oscillating frequencies. As an example, a circuit or circuits may provide for voltage magnification. As an example, one or more series, one or more parallel, etc., LC types of circuits may be utilized and electrically coupled to a transducer, for example, utilizing one or more switches.

As an example, a circuit can be a boost type of circuit. For example, consider a voltage boost circuit that with an applied voltage in and a switch closed, current flows through an inductor along a path to ground where the inductor stores energy in its magnetic field. In such an example, when the switch is open, current can flows along a path as the collapsing magnetic field generates a positive voltage and transfers the inductor energy through a forward biased diode to a transducer.

As to boost circuits, consider one or more circuits of a high-voltage 3.6 A integrated switch PFM/PWM boost regulator such as the MCP1665 (Datasheet DS20005872A, Microchip Technology Inc., 2017), which includes a circuit for 5V in to 42 V out at 200 mA; noting that various components may be provided for different input voltages and/or output of voltages greater than 42 V.

As an example, a downhole tool can include and/or be operatively coupled to a power supply, which may be a DC and/or AC power supply. As an example, a downhole tool can include an AC/DC converter. As an example, a downhole tool can include bridge circuitry such as, for example, full-bridge, half-bridge, etc., which may be utilized for driving a wide-band frequency emission.

As an example, an inductor can be selected as part of a boost circuit where the inductor stores energy during an on-time of a power switch and transfers energy to an output through an output rectifier diode during the off time of the power switch.

As mentioned, a tool can operate with an ultrasonic beam diameter at one or more different central frequencies. As mentioned, a tool can include a transducer that can receive power at a voltage that can be sufficient for the transducer to generate and emit ultrasonic energy in a downhole environment. As mentioned, a tool can include DSP circuitry for processing an echo received in response to emission of ultrasonic energy where the echo can include information as to a downhole environment. In such an example, the DSP circuitry can provide for processing echo data with respect to one or more frequencies where, for example, one or more comparisons may be made based at least in part on frequency.

As an example, a downhole tool can include a variety of digital circuitry. For example, consider DSP circuitry, switching circuitry, boost circuitry, etc. In such an example, the digital circuitry can be powered using one or more power sources such as, for example, one or more batteries, one or more power lines, etc.

Figure 13:
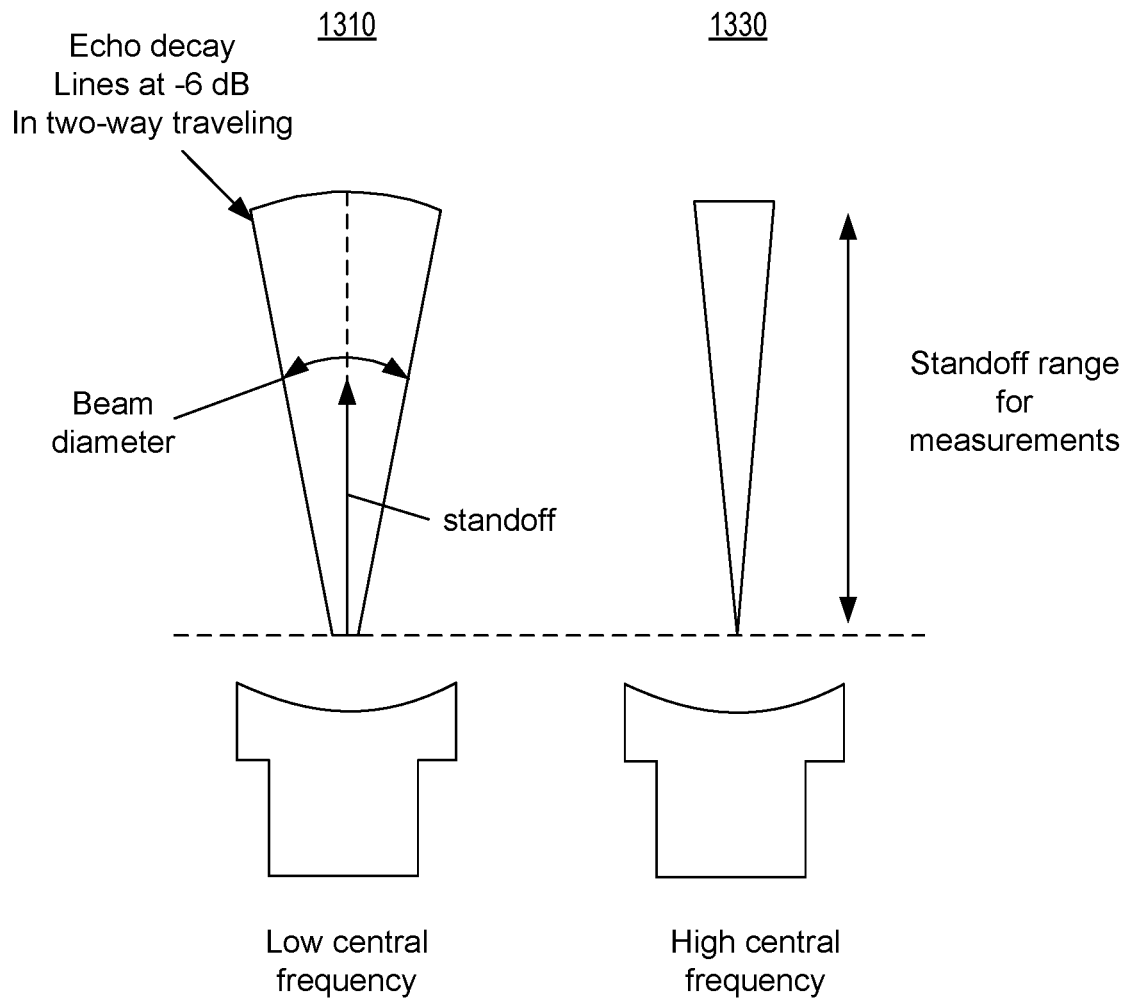
FIG. 13 illustrates examples of equipment operating as to different frequencies.

FIG. 13 shows a schematic 1300 of examples of ultrasonic transducers 1310 and 1330 with corresponding echo beam profiles. As shown, the transducer 1310 is at a low central frequency while the transducer 1330 is at a high central frequency. In FIG. 13, a dashed black line represents a minimum standoff or distance from tool surface and target (e.g., borehole surface).

As an example, beam diameters may be defined as −6 decibel (dB) magnitude decay lines for a two-way traveling signal. As shown in FIG. 13, beam diameter can change in a manner that depends on central frequency (e.g., center frequency). As an example, beam diameter can be defined for a given frequency and standoff. FIG. 13 illustrates how multiple central frequencies can be utilized in a tool for purposes of acquiring and/or processing data to generate output as to physical conditions in a downhole environment.

Figure 14:
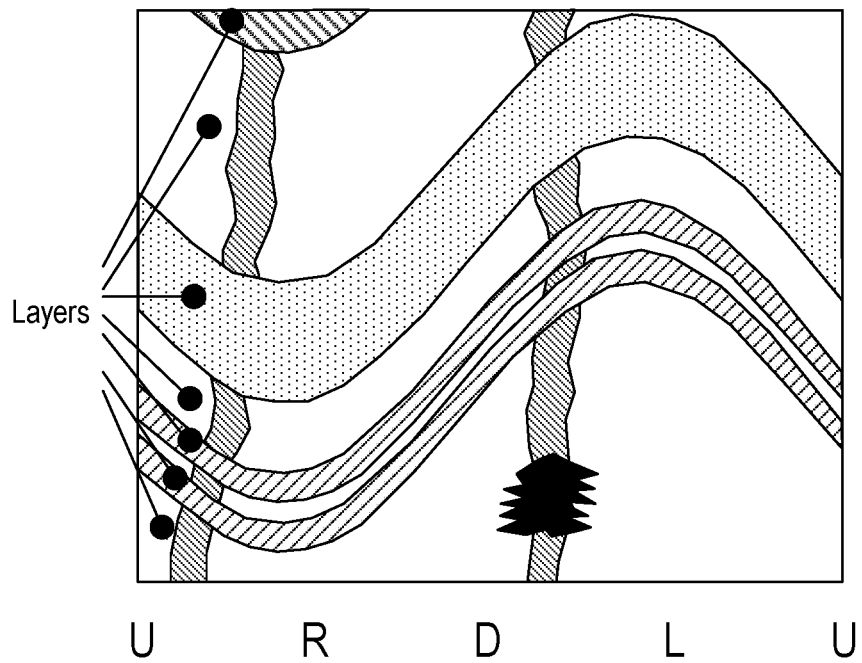
FIG. 14 illustrates examples of diagraph images generated from acquired data with respect to frequency.
Figure 14:
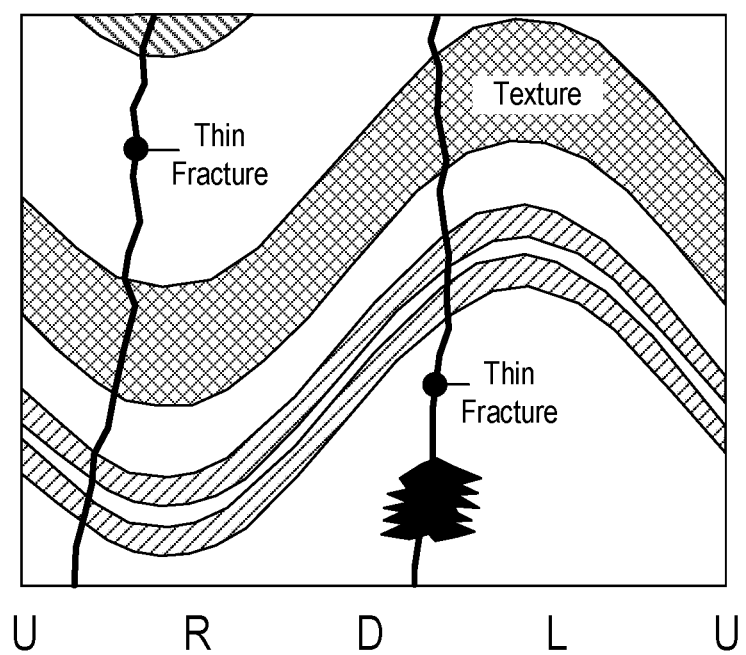

FIG. 14 shows diagraphs 1410 and 1430 for imaging at two different frequencies, one being a low center frequency, f1, and another being a high center frequency, f2. Center frequencies (or central frequencies) can be defined by appropriate metrics such as outer frequencies, which may be defined with respect to one or more criteria (e.g., frequency content, amplitude, cut-off, etc.). As mentioned, a diagraph can be a 2D formatted image or graphic of cylinder surface types of data. In the example diagraphs 1410 and 1430, U represents uphole, D represents downhole, R represents right and L represents left. As shown, the diagraphs 1410 and 1430 are for a cylinder surface that is cut along the uphole direction (see, e.g., north direction in the example graphic 980 of FIG. 9).

In electrical engineering and telecommunications, the center frequency of a filter or channel is a measure of a central frequency between the upper and lower cutoff frequencies. It may be defined as either the arithmetic mean or the geometric mean of the lower cutoff frequency and the upper cutoff frequency of a bandpass system or a band-stop system.

As an example, a geometric mean may be used in systems based on certain transformations of lowpass filter designs, where the frequency response is constructed to be symmetric on a logarithmic frequency scale. A geometric center frequency corresponds to a mapping of the DC response of the prototype lowpass filter, which is a resonant frequency sometimes equal to the peak frequency of such systems, for example as in a Butterworth filter.

As an example, an arithmetic definition may be used in more general situations, such as in describing passband telecommunication systems, where filters are not necessarily symmetric but are treated on a linear frequency scale for applications such as frequency-division multiplexing.

As mentioned, FIG. 14 illustrates example diagraphs 1410 and 1430, which can be images generated from attributes extracted at the two central frequencies, f1 and f2 (in the order of central frequency value where f2 is greater than f1).

As shown, the diagraph 1430 image at f2 (f2>f1) is capable of visualizing fine borehole surface texture and thin fractures being higher in contrast than those in the diagraph 1410 image at f1. The diagraph 1430 demonstrates features that can be imaged using a smaller beam diameter and shorter acoustic wavelength in fluid. As to the diagraph 1430 image at f2, the amplitude at f2 is much more sensitive to such small geometrical variations, so that it is useful to visualize and quantify such formation/borehole properties. The diagraph 1410 image at f1 can be beneficial to visualize geological and/or geophysical properties represented by acoustic impedance.

Ultrasonic energy at a low frequency tends to be less sensitive to surface texture and geometrical changes, so that amplitude has a higher sensitivity to acoustic impedance than at a higher frequency. Therefore, resulting image tends to be useful to quantify such formation behavior for geological and geomechanical interpretation.

Figure 15:
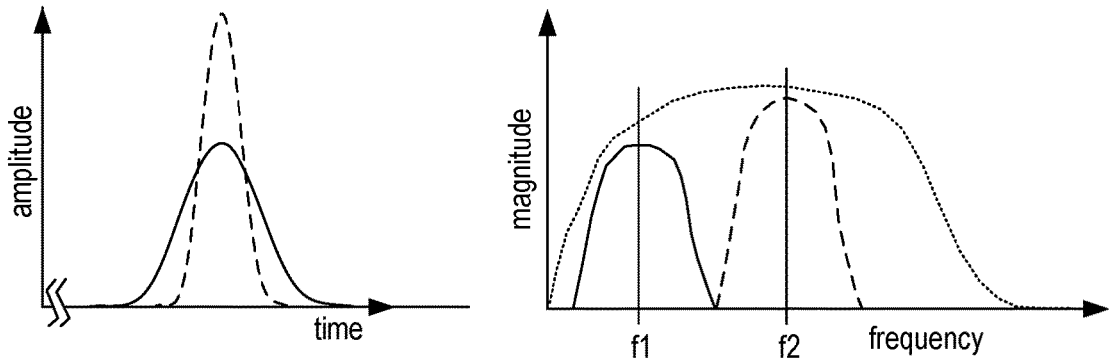
FIG. 15 illustrates example plots of data with respect to materials.
Figure 15:
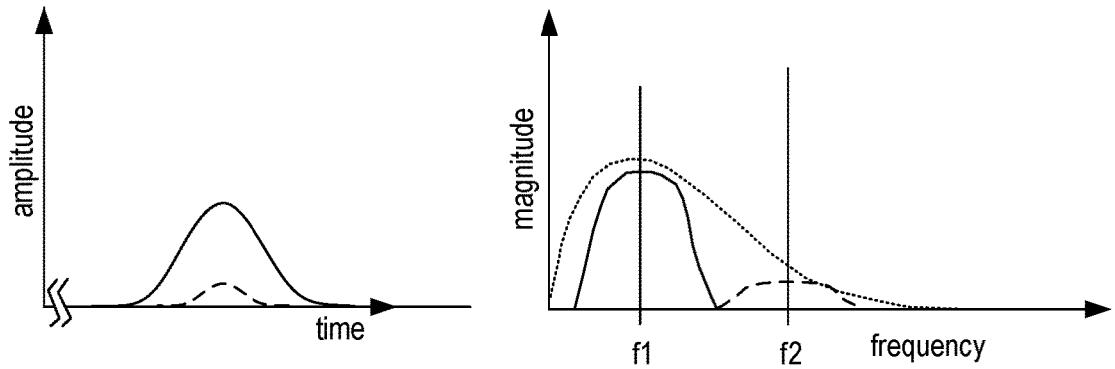

FIG. 15 shows example plots 1510 and 1530, which correspond to low attenuation well fluid (e.g., water) and higher attenuation well fluid (e.g., heavy oil-based mud), respectively. As to a robust caliper at a lower frequency in attenuative well fluid, the example plots 1510 and 1530 illustrates bandpass filtered echo signals in time and frequency domain, respectively to the left and to the right. In the plots 1510 and 1530, dashed and solid black curves, respectively, represent high and low frequency signals while a dotted curve represents the raw spectrum of signal before applying bandpass filters.

In a low attenuation fluid, per the plot 1510, the raw spectrum preserves wide frequency content. High frequency signal at a central frequency f2 has higher amplitude in the time-domain and larger magnitude in the frequency-domain. On the other hand, in attenuative well fluid, per the plot 1530, high frequency components are damped at a higher attenuation rate that is proportional to the central frequency.

As a result, low frequency echo signal still preserves high amplitude in the time domain, and larger magnitude in the frequency domain, so that reliable echo detection and attribute extraction are available when low frequency amplitude is larger than a noise threshold of A1. High frequency echo signal detection may be reduced to the level that reliable detection can be challenging, if amplitude is lower than or equal to a preset noise threshold A2.

Figure 16:
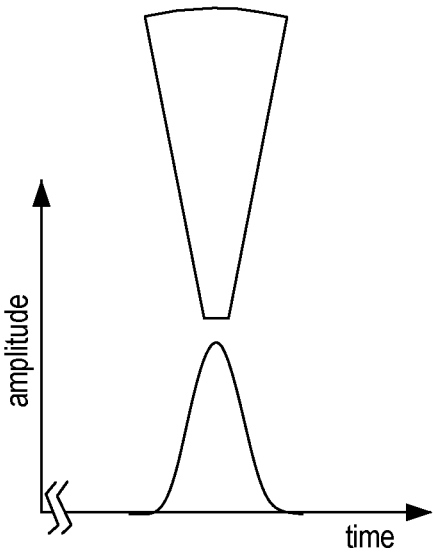
FIG. 16 illustrates example plots of data with respect to frequencies and characteristics of material.
Figure 16:
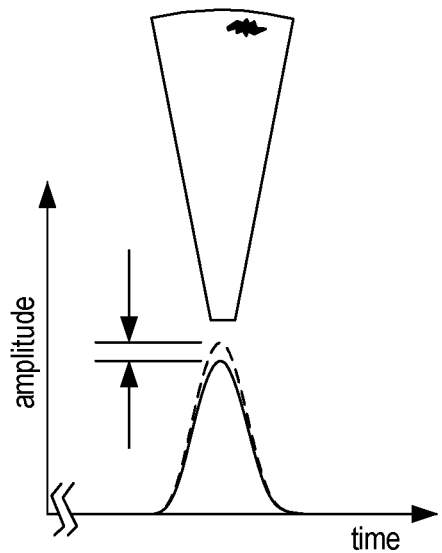
Figure 16:
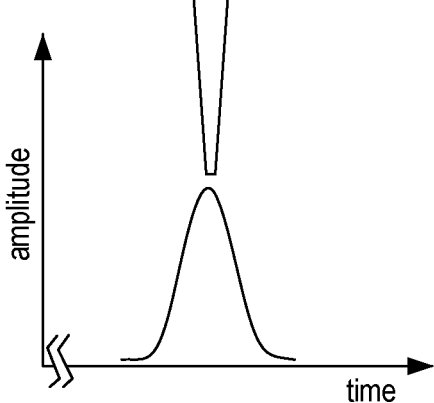
Figure 16:
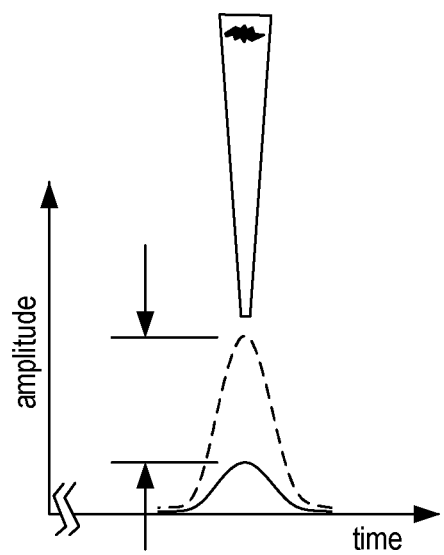

FIG. 16 shows examples of graphics 1610, 1615, 1620 and 1625 as to robust caliper at two frequencies, f1 and f2, in the presence of cuttings from drilling (e.g., formation debris, etc.) and in the absence of cuttings from drilling The graphics 1620 and 1625 illustrates echo signal amplitude reduction due to cutting perturbation in echo reception. Ultrasonic beam diameter is relatively small, so that echo amplitude tends to be highly sensitive to cuttings with dimensions larger than a quarter wavelength. For caliper measurements, high frequency (f2) measurements can be perturbed by relatively smaller cuttings. As illustrated in FIG. 16, to reduce influence of cuttings on formation echo, the low frequency (f1) can be useful as it is less sensitive to cuttings than the high frequency (f2).

Figure 17:
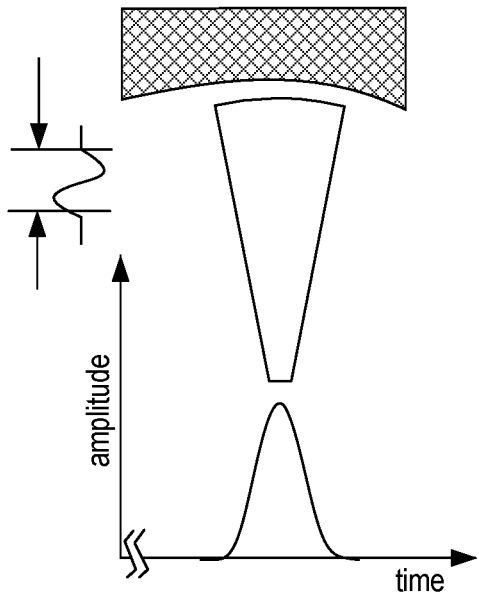
FIG. 17 illustrates example plots of operational techniques with respect to borehole wall characteristics.
Figure 17:
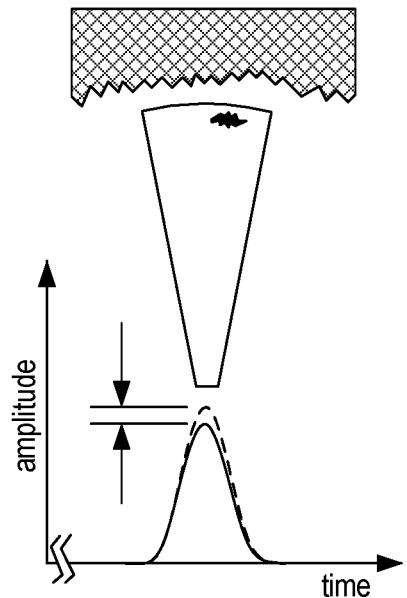
Figure 17:
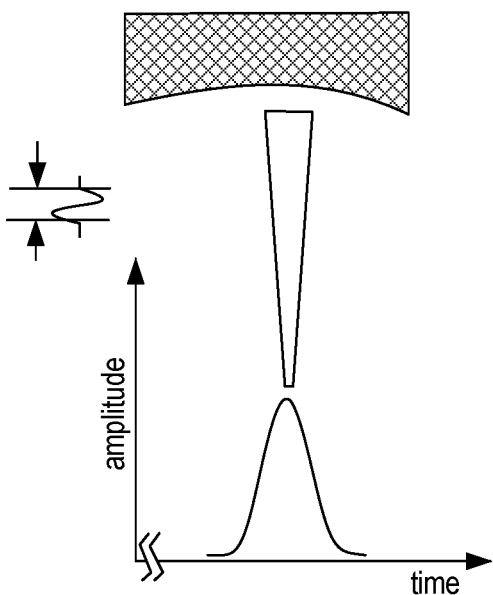
Figure 17:
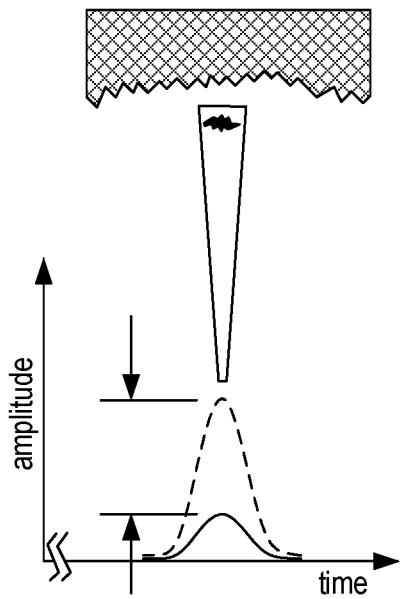

FIG. 17 shows examples of graphics 1710, 1715, 1720 and 1725 as to some examples of beneficial aspects of low frequency imaging for acoustic impedance measurements. FIG. 17 presents differences in echo amplitude sensitivity as a function of frequency or wavelength in well fluid. As shown, echo amplitude changes as a function of acoustic impedance ratio between well fluid and formation, and geometrical factor, such as rugosity.

As shown in FIG. 17, low frequency echo signals are shown in the graphics 1710 and 1720 and high frequency echo signals are shown in the graphics 1715 and 1725. As shown, smooth and rough borehole surface are illustrated in the graphics 1710 and 1715 and the graphics 1720 and 1725, respectively. When roughness is larger than quarter wavelength at the central frequency of an ultrasonic pulse, echo amplitude may sensitively change. Low frequency echo amplitude change can be much smaller than high frequency echo amplitude change. For example, in water, quarter wavelength at 125 kHz and 375 kHz are respectively 3 mm and 1 mm. In attenuative mud, acoustic wave propagation speed is slower than in water, so that quarter wavelength will be shorter, for example, approximately 10 percent to approximately 20 percent shorter.

To characterize formation properties for acoustic impedance minimizing error caused by surface roughness, low frequency can be more advantageous than high frequency. High frequency may be useful to characterize formation for fine surface texture representing vugs and thin fractures.

High and low frequency pulse-echo measurements are also useful to visualize well casing features, such as pitting, holes and surface roughness for well integrity services, more specifically casing corrosion. Reduced amplitude due to pit and hole or surface texture can be compensated for tool eccentricity, utilizing low frequency standoff measurements as an option.

Figure 18:
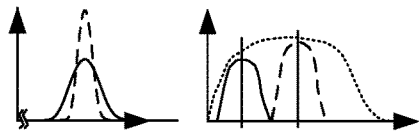
FIG. 18 illustrates examples of methods.
Figure 18:
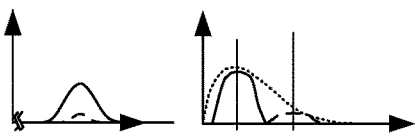
Figure 18:
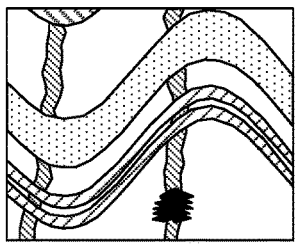
Figure 18:
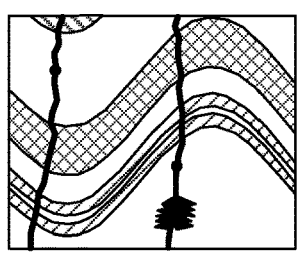

FIG. 18 shows example methods 1810 and 1830. The method 1810 can include receiving input 1814, processing the input 1814 using a machine model 1818 and generating output 1822. The method 1830 can include receiving input 1834, processing the input 1834 using a machine model 1838 and generating output 1842. As shown, the input 1814 and the input 1834 can be multi-frequency input. For example, the input 1814 can include data such as the data of the plots 1510 and 1530 of FIG. 15 and the input 1834 can include data such as the data of the diagraph images 1410 and 1430 of FIG. 14.

As an example, a machine model can be a machine learning model such as a decision tree model, a neural network model, etc. As an example, a method can include training a machine learning model to generate a trained machine learning model. For example, an interpreter can label data where the labeled data can be utilized for training and, for example, for testing. Training can involve determining weights of node, number of decision tree branches, etc. As an example, a trained machine learning model can be a light-weight model that is of a size suitable for storage in memory of a downhole tool and executable using circuitry of the downhole tool. For example, consider a trained neural network model that can receive signals in the time domain and/or the frequency domain and output, probabilistically, one or more characteristics of material and/or borehole geometry.

As shown in FIG. 15, well fluid attenuation can be distinguished using a multi-frequency approach. As shown in FIG. 14, data can be an image or images. In such an approach, an image-based trained neural network model may be utilized to output, probabilistically, features such as layers, fractures, textures, etc. In such an example, the trained neural network model can be a "stereo" image input model where "stereo" refers to an image at one center frequency and an image at another center frequency. Alternatively, or additionally, an image may be a multi-frequency image that can be processed to output, probabilistically, characteristics of material and/or borehole geometry.

As an example, a downhole tool can include one or more circuits for performing downhole feature extraction, which can be processor-based circuits. For example, a downhole tool can include memory and a processor that can access the memory where the memory includes instructions executable by the processor to perform downhole feature extraction using multiple frequency data (e.g., data from emissions with two or more center frequencies). As an example, a downhole tool can include a signal library that can be accessed to make comparisons to extract features. Such a signal library may be operatively coupled to a decision tree model. As an example, a downhole tool can include a borehole feature image database, which may utilize one or more compression techniques. As an example, data may be compressed or reduced and a feature set data may be compressed or reduce, which may help to increase speed, conserve memory, etc.

As an example, output of a trained machine learning model can be a log, which may be, for example, a real-time log that is generated as a downhole tool used in a borehole to make measurements. For example, a log can be a feature attribute log where the feature attributes may relate to material and/or borehole geometry.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor, k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a deep learning (DL) framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, training may be performed using GPU-based workstations, clusters and/or clouds (e.g., consider NVIDIA GPU Cloud and Amazon EC2 GPU instances, etc.).

Figure 19:
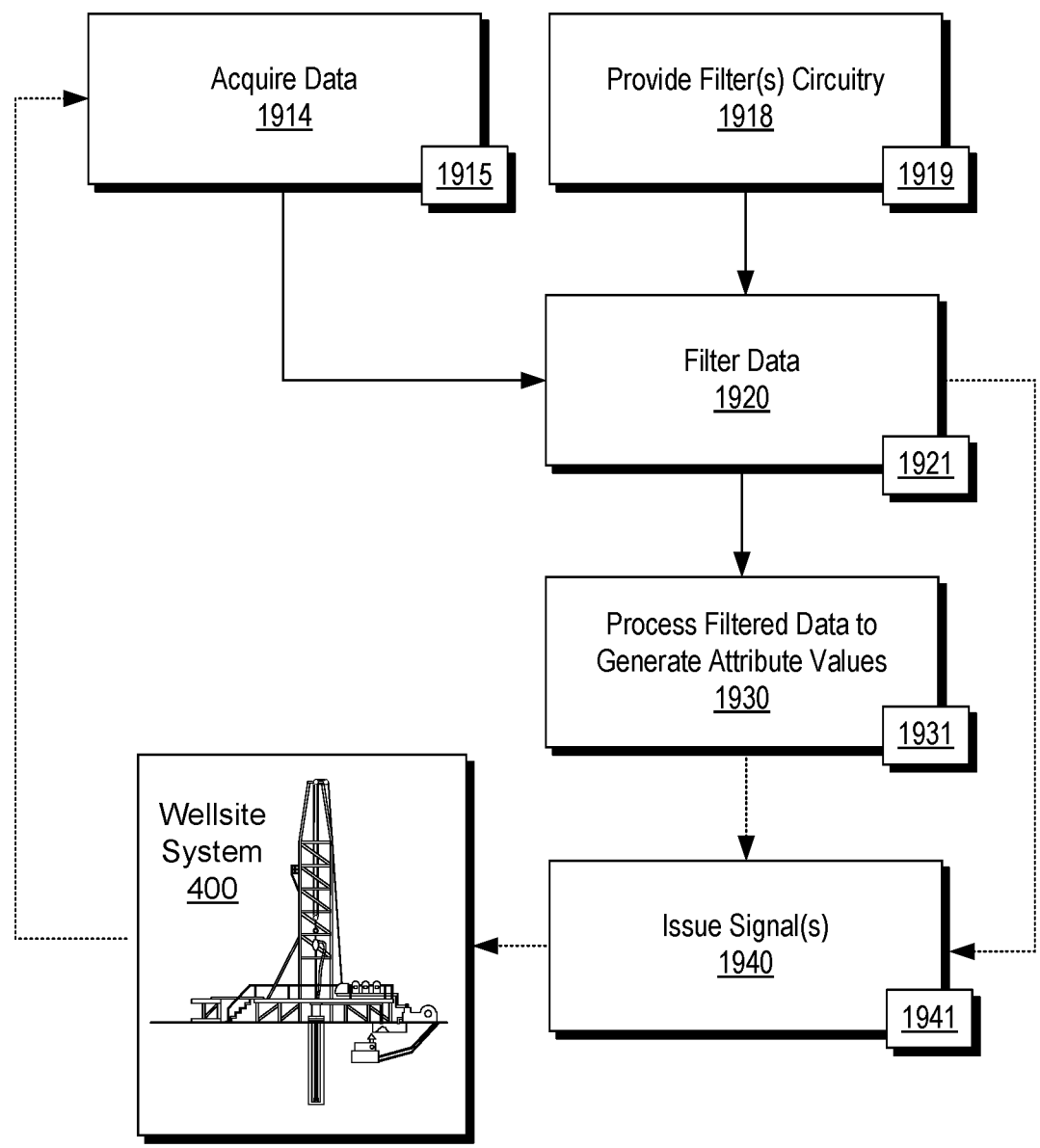
FIG. 19 illustrates an example of a method.

FIG. 19 shows an example of a method 1900 that includes an acquisition bloc 1914 for, using a downhole tool, acquiring ultrasonic echo data of a borehole, where the ultrasonic echo data include echoes representative of material and borehole geometry responsive to reflection of ultrasonic energy that has a wide-band frequency range; a filter block 1920 for filtering the ultrasonic echo data using at least one selected filter for multi-band frequency filtering corresponding to different frequency ranges of the wide-band frequency range to generate filtered data; and a process block 1930 for processing the filtered data to generate attribute values representative of physical characteristics the material, the borehole geometry, or the material and the borehole geometry.

As an example, the method 1900 can include acquiring ultrasonic echo data of a borehole via a tool (e.g., via the acquisition block 1914), where the ultrasonic echo data include echoes representative of material and borehole geometry responsive to reflection of ultrasonic energy (e.g., wave energy) that has an effective borehole area for ultrasonic probing as a function of a frequency range; filtering the ultrasonic echo data (e.g., via the filter block 1920) using at least one selected filter that includes a frequency within the frequency range to generate filtered data; and processing the filtered data (e.g., via the process block 1930) to generate at least one attribute value representative of at least one physical characteristic of at least one of the material and the borehole geometry.

As shown, the method 1900 can include an issuance block 1940 for, based on filtered data (e.g., and/or processing thereof), issuing a control signal to the equipment in the geologic environment (see, e.g., equipment of the wellsite system 400, etc.). In the example of FIG. 19, a provision block 1918 may be included for providing one or more filters, which may be applied by the filter block 1920.

In the example of FIG. 19, the wellsite system 400 is illustrated as an example of some types of equipment that may be utilized to perform one or more operations in a geologic environment. As an example, the method 1900 of FIG. 19 may be implemented using the system 470 of FIG. 4 and/or the system 560 of FIG. 5.

The method 1900 is shown as including various computer-readable storage medium (CRM) blocks 1915, 1919, 1921, 1931 and 1941 that can include processor-executable instructions that can instruct a computing system, which can be a control system, to perform one or more of the actions described with respect to the method 1900.

Figure 20:
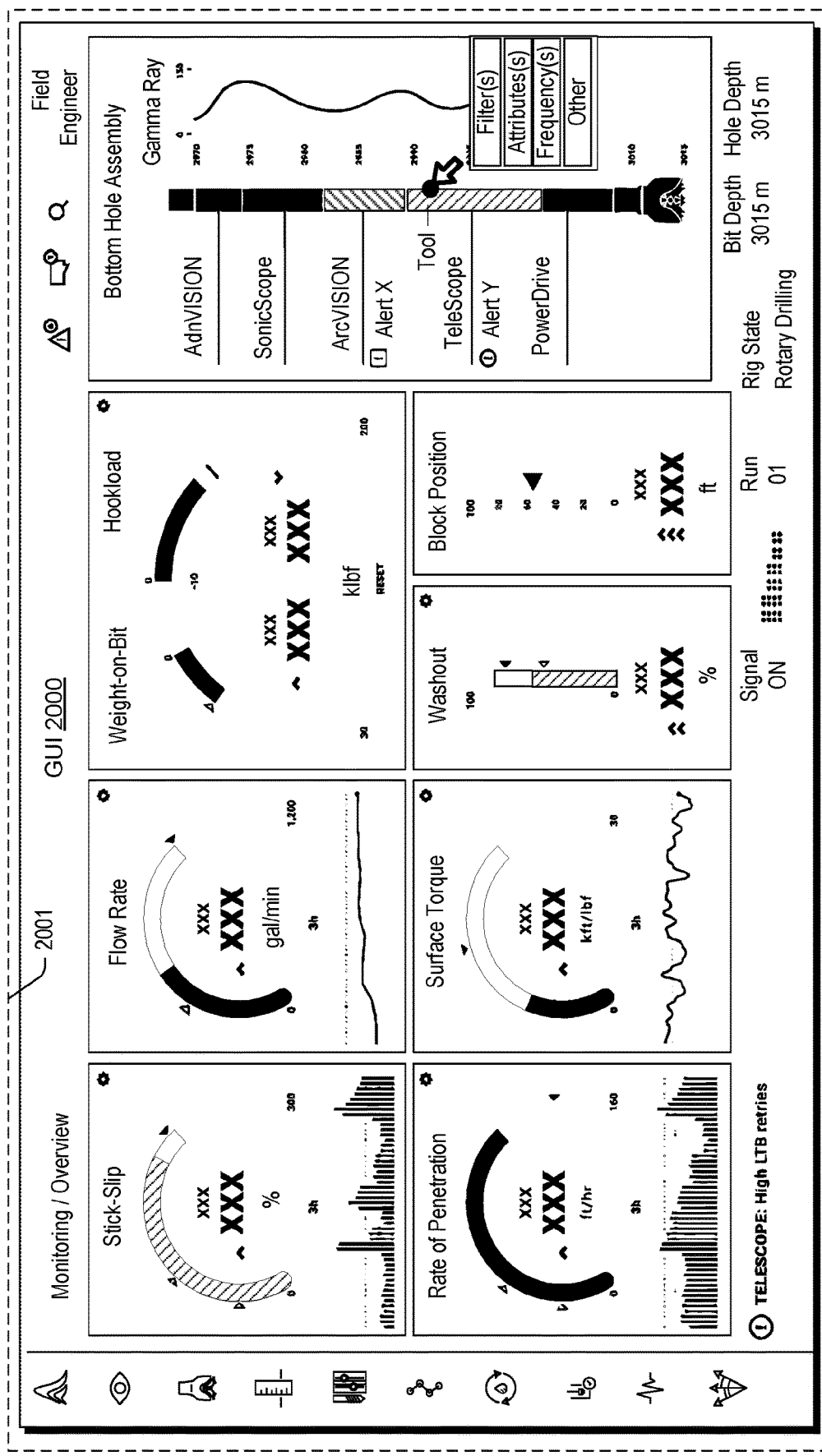
FIG. 20 illustrates an example of a graphical user interface.

FIG. 20 shows an example of a GUI 2000 that is rendered to a display device 2001, represented by a dashed box. For example, consider a flat panel display, which may be, for example, a touchscreen display. As an example, one or more of the plots illustrated herein may be rendered to a display by a computational system, which may be a dynamic field operations system. Such plots may be rendered as part of a graphical user interface (GUI) and may be interactive where a user may instruct a computational system to render a portion of a data, a filter response, a control signal, etc.

In the example of FIG. 20, the GUI 2000 may be an operational dashboard where the state of one or more pieces of equipment, operations, etc. may be rendered visually, for example, via graphics and/or numbers. As an example, various colors may be utilized to convey state information. As an example, audio may be associated with the GUI 2000 and changes thereto, etc. For example, where a parameter reaches a limit, a color change may occur to a graphic of the display device 2001 and an audio alarm may be rendered via one or more speakers.

In the example of FIG. 20, the GUI 2000 can include various graphical controls that can be associated with various operations to perform one or more methods that include filtering data, for example, for generating filtered data and, for example, attributes, etc. As shown, a user may select a tool on the graphic of the bottom hole assembly and specify and/or select one or more parameters, etc., for operation of the tool and/or processing of data acquired by the tool. As an example, a graphical control can provide for rendering a visualization of at least one of echo signal attributes that is representative of one or more characteristics of a borehole and/or material. For example, consider a graphical window that renders a shape of a borehole that are generated from echo signal travel time as a result of processing data acquired by the tool and/or that renders borehole features representing physical characteristic of formation material that are generated from echo signal amplitude as a result of processing data acquired by the tool. As shown, menu items can include filter(s), attribute(s), frequency(ies) and other.

As an example, a method may execute in a background mode where a selection via a graphical control causes rendering of information generated by a method such as the method 1900 of FIG. 19.

As an example, a method can include acquiring ultrasonic echo data of a borehole via a tool, where the ultrasonic echo data include echoes representative of material and borehole geometry responsive to reflection of ultrasonic energy with an effective area for ultrasonic probing that can vary as a function of frequency range; filtering the ultrasonic echo data using at least one selected filter that includes a frequency within the frequency range to generate filtered data; and processing the filtered data to generate at least one attribute value representative of at least one physical characteristic of at least one of the material and the borehole geometry. Such a method can include rendering a visualization of one or more features of the borehole using the at least one attribute value. A method can, for example, include combining a plurality of attribute values for one or more types of attributes to visualize one or more features of a borehole. Such an approach can include selecting a plurality of types of attributes (e.g., via a menu, via control signal, via hardwiring, via programming, etc.).

As an example, a tool can be a downhole tool, which may be part of one or more of a drillstring, a wireline, a through bit and a coiled tubing.

As an example, a tool can include a transmitter, which may be part of a transducer (e.g., a transmitter and a receiver). As an example, a method can include exciting a transmitter to emit ultrasonic energy in a wide frequency band. In such an example, the wide frequency band can include a frequency minimum of approximately 50 kHz and can include a frequency maximum of approximately 1 MHz. In such an example, emission of ultrasonic energy (e.g., ultrasonic wave energy) in the wide frequency band can be as a single emission that is in response to a single excitation of the transmitter.

As an example, a method can include filtering at one or more frequency bands. For example, consider utilizing a band that includes a central frequency and at least one pass-band frequency.

As an example, filtered data can include frequency-dependent attributes that correspond to a single excitation of a transmitter of a tool. Such an approach can include filtering that is performed using one or more frequency bands where one band includes a central frequency and a pass-band frequency to extract the frequency-dependent attributes. As an example, a method can include utilizing a plurality of different central frequencies, selected from frequencies in a range from approximately 50 kHz to approximately 1 MHz. In such an example, consider selecting a pass-band frequency (or frequencies) for each of the central frequencies.

As an example, a selectable filter may be a filter of a digital signal processing integrated circuit (DSP IC). As an example, a DSP IC may be utilized to provide one or more filters, which may be selectable filters. As an example, a method can include selecting a filter and processing acquired data, selecting another filter and processing acquired data, which may be the same acquired data. In such an example, the acquired data can be ultrasonic echo data as acquired in response to emission of a wide band burst of ultrasonic energy (e.g., an ultrasonic wave, etc.).

As an example, a plurality of different central frequencies may be varied linearly in a manner that linearly and virtually varies a diameter of an ultrasonic beam to interrogate a surface of a borehole via processing ultrasonic echo data, for example, as responsive to a single excitation of a transmitter of a tool where the transmitter may be a transducer (e.g., that receiving the ultrasonic echo data).

As an example, a method can include processing that includes analyzing first filtered data generated by application of a first filter, processing second filtered data generated by application of a second filter or processing first filtered data and second filtered data. In such an example, the processing can generate a first physical characteristic of the material or/and the borehole geometry via processing the first filtered data and/or generate a second physical characteristic of the material or/and the borehole geometry via processing the second filtered data.

As an example, a method can include extracting one or more types of attributes using a plurality of different frequency bands.

As an example, a method can include processing that includes borehole texture and feature imaging using echo amplitude at high-frequency bandpass filtering and/or borehole shape imaging using travel time of low-frequency bandpass filtered data of which amplitude may be less dependent on borehole fluid acoustic attenuation and borehole enlargement.

As an example, a method can include drilling using a drillstring that includes a tool (e.g., an ultrasonic tool). In such an example, the method can include performing acquisition of ultrasonic echo data during the drilling.

As an example, a material can be drilling fluid and a physical characteristic of the material can be a physical characteristic of the drilling fluid.

As an example, material can be formation material and a physical characteristic of the material can be a physical characteristic of the formation material.

As an example, a method can include utilizing two different selected filters, where one of the selected filters generates at least one of echo attributes of filtered data in low spatial resolution and the other one of the selected filters generates echo attributes of filtered data in high spatial resolution.

As an example, a system can include one or more processors; memory operatively coupled to the one or more processors; and processor-executable instructions stored in the memory and executable by at least one of the processors to instruct the system to: acquire ultrasonic echo data of a borehole via a tool, where the ultrasonic echo data include echoes representative of material and borehole geometry responsive to reflection of ultrasonic energy of an effective probing area that varies as a function of a frequency range; filter the ultrasonic echo data using at least one selected filter that include a frequency within the frequency range to generate filtered data; and process the filtered data to generate at least one attribute value representative of at least one physical characteristic of at least one of the material and the borehole geometry. As an example, such a system can include a display and instructions executable to render a visualization of one or more features of the borehole using the at least one attribute value. As an example, a system can include instructions executable to combine a plurality of attribute values for one or more types of attributes to visualize one or more features of a borehole. Such a system can include instructions executable to select a plurality of types of attributes.

As an example, one or more computer-readable storage media can include computer-executable instructions executable to instruct a computing system to: acquire ultrasonic echo data of a borehole via a tool, where the ultrasonic echo data include echoes representative of material and borehole geometry responsive to reflection of ultrasonic energy of an effective probing area that varies as a function of a frequency range; filter the ultrasonic echo data using at least one selected filter that includes a frequency within the frequency range to generate filtered data; and process the filtered data to generate at least one attribute value representative of at least one physical characteristic of at least one of the material and the borehole geometry. Such one or more computer-readable media can include instructions executable to render a visualization of one or more features of the borehole using the at least one attribute value. Such one or more computer-readable media may include instructions executable to combine a plurality of attribute values for one or more types of attributes to visualize one or more features of a borehole where such instructions may include instructions executable to select a plurality of types of attributes.

As an example, a downhole tool can include an ultrasonic energy emitter (e.g., a wave emitter) and echo receiver that receives echo data responsive to ultrasonic energy emissions; a plurality of filters configured to perform bandpass filtering of the echo data at two or more central frequencies to generate filtered data; and a controller that controls the ultrasonic energy emitter and echo receiver and the plurality of filters. As an example, such a downhole tool may include circuitry such as the circuitry of FIG. 12 and/or circuitry that includes one or more of the components of the circuitry of FIG. 12. As an example, a downhole tool can include a transducer that can emit and receive energy (e.g., ultrasonic energy).

As an example, a method can include, using a downhole tool, acquiring ultrasonic echo data of a borehole, where the ultrasonic echo data include echoes representative of material and borehole geometry responsive to reflection of ultrasonic energy that includes a wide-band frequency range; filtering the ultrasonic echo data using at least one selected filter for multi-band frequency filtering corresponding to different frequency ranges of the wide-band frequency range to generate filtered data; and processing the filtered data to generate attribute values representative of physical characteristics the material, the borehole geometry, or the material and the borehole geometry. In such an example, the method can include storing the attribute values with corresponding data stamps that map the attribute values to respective borehole orientations and borehole depths where, for example, the method can include transmitting the attribute values with the corresponding data stamps from the downhole tool to surface equipment.

As an example, a method can include rendering at least one attribute value using surface equipment to visualize the physical characteristics of the material, the borehole geometry, or the material and the borehole geometry. For example, a spiral graph may be rendered that provides a representation of a portion of a borehole (e.g., as looking down the borehole), a diagraph image may be rendered that provides a representation of features that may include layers and fractures, one or more logs may be rendered, for example, with respect to depth (e.g., measured depth).

As an example, a downhole tool can include at least one transmitter that emits ultrasonic energy in a wide-band frequency range. For example, consider a wide-band frequency range that includes a frequency minimum of approximately 50 kHz and includes a frequency maximum of approximately 1 MHz. As an example, emission of ultrasonic energy in a wide-band frequency range can be a single emission that is in response to a single excitation of a transmitter. As an example, the transmitter can be part of a transducer, where the transmitter is an emitter and where the transducer includes a receiver that can receive echo energy.

As an example, a method can include filtering using at least one selected filter that can be an analog filter or a digital filter. As an example, a filter may be in part analog and in part digital.

As an example, different frequency ranges can be utilized to vary beam diameter, vary wavelength to interrogate a surface of the borehole at different sensitivities, and/or vary energy attenuation in drilling fluid as a function of frequency.

As an example, a method can include extracting attribute values from echo data responsive to a single emission of ultrasonic energy that has a wide-band frequency range.

As an example, a method can include processing first filtered data generated by application of a first filter, processing second filtered data generated by application of a second filter or processing first filtered data and second filtered data. In such an example, processing can generate a first physical characteristic of the material or/and the borehole geometry via processing the first filtered data and/or generate a second physical characteristic of the material or/and the borehole geometry via processing the second filtered data.

As an example, a method can include rendering, using at least a portion of extracted attribute values, a visualization of at least one of a borehole texture using echo amplitude of high-frequency bandpass filtered data; a borehole shape image using travel time of high-frequency bandpass filtered data; a borehole shape image using travel time of low-frequency bandpass filtered data that is immune to borehole fluid acoustic attenuation, borehole enlargement and borehole surface rugosity; and a formation material image using echo amplitude with sensitivity to acoustic impedance of the formation that is higher than borehole surface rugosity and/or borehole texture.

As an example, one or more computer-readable storage media can include processor-executable instructions, executable to instruct a downhole tool to: acquire ultrasonic echo data of a borehole, where the ultrasonic echo data includes echoes representative of material and borehole geometry responsive to reflection of ultrasonic energy that has a wide-band frequency range; filter the ultrasonic echo data using at least one selected filter for multi-band frequency filtering corresponding to different frequency ranges of the wide-band frequency range to generate filtered data; and process the filtered data to generate attribute values representative of physical characteristics the material, the borehole geometry, or the material and the borehole geometry.

As an example, a downhole tool can include an ultrasonic energy emitter and echo receiver that receives echo data responsive to ultrasonic energy emissions; a plurality of filters configured to perform bandpass filtering of the echo data at one or more different central frequencies to generate filtered data; telemetry circuitry; and a downhole system that controls the ultrasonic energy emitter and echo receiver, controls the plurality of filters, controls extraction of attributes of bandpass filtered echo data, controls storage of the attributes, and controls transmission of at least a portion of the attributes via the telemetry circuitry. In such an example, the ultrasonic energy emitter and echo receiver can be referred to as a transducer that can transmit and receive ultrasonic energy (e.g., transmit energy toward a borehole wall and receive echo energy in response).

As an example, a downhole tool can include circuitry that can provide one or more central frequencies of bandpass filters that are distributed at desired frequency gaps in a frequency band of emitted ultrasonic energy by an ultrasonic energy emitter and echo receiver. As an example, one or more different central frequencies to perform bandpass filtering can be distributed at desired frequency gaps in a frequency band of emitted ultrasonic energy by an ultrasonic energy emitter and echo receiver.

As an example, filtered data can include frequency-dependent attributes extracted from echo data responsive to a single excitation of a transmitter of a downhole tool. As an example, filtered data can include frequency-dependent attributes from a single excitation emitted by an ultrasonic energy emitter and echo receiver.

As an example, a downhole tool can include a battery and digitally controlled voltage step-up circuitry that steps-up the voltage of the battery to a higher voltage for emission of ultrasonic energy from the ultrasonic energy emitter and echo receiver.

As an example, a downhole tool can include digitally controlled voltage step-up circuitry that steps-up an input voltage to a higher voltage for emission of ultrasonic energy from a transmitter of an ultrasonic energy emitter and echo receiver.

As an example, a downhole tool can include a digital signal processor (DSP). As an example, a downhole tool can include a digital switch operatively coupled to power circuitry. As an example, a downhole tool can include a digital master controller that can control at least a DSP, a digital switch and storage of attribute values in memory.

As an example, a downhole tool can include one or more microprocessors. For example, consider a microprocessor-based system on a chip (e.g., consider an ARM architecture). As an example, a microprocessor can include a reduced instruction set in a reduced instruction set computing (RISC) architecture.

As an example, a system on a chip approach may be utilized for one or more of powering, emitting, receiving, filtering, storing, and telemetry transmitting. As an example, such a system on a chip can provide for extracting attribute values from echo data responsive to a wide-band frequency emission of ultrasonic energy where the attribute values characterize material and/or borehole geometry. As mentioned, a downhole tool can include telemetry that can communicate with surface equipment and/or another downhole tool. As an example, a drillstring and/or a wireline can include more than one downhole tool where one of the downhole tools can output attribute values to control one or more other downhole tools, which may be direct (e.g., downhole tool to downhole tool) or indirect (e.g., downhole tool to surface equipment to downhole tool).

As an example, a downhole tool can include a trained machine model. In such an example, the trained machine model can process echo data and extract one or more types of attributes, for example, as attribute values.

As an example, a downhole tool can be programmed to self-adjust where the downhole tool includes circuitry that can provide for frequency control, whether in emissions or in filtering. In such an example, a downhole tool may include a decision tree model that can, based on data, determine one or more operational parameters, which can include frequency-related parameters.

Figure 21:
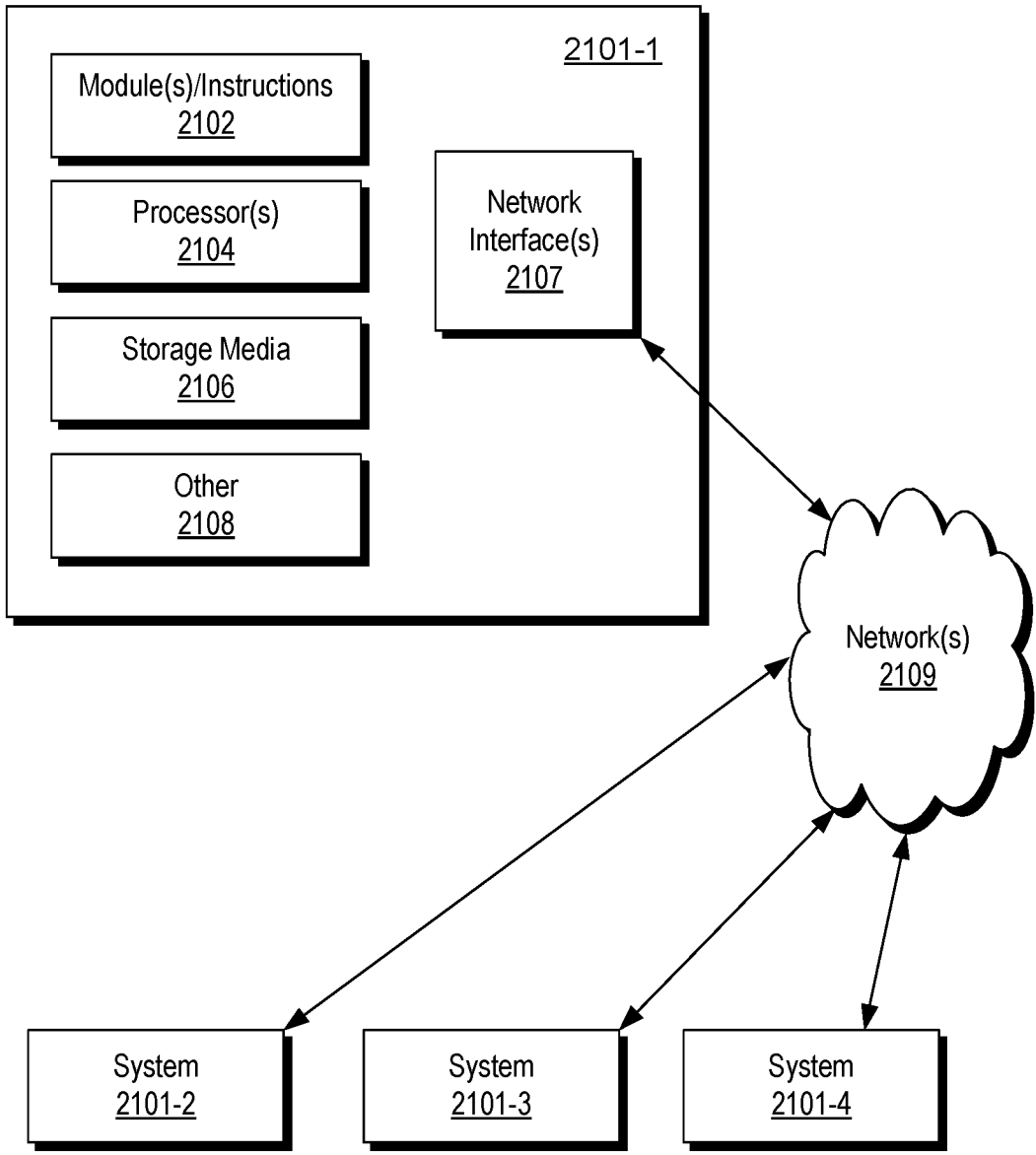
FIG. 21 illustrates examples of computing and networking equipment.

In some embodiments, a method or methods may be executed by a computing system. FIG. 21 shows an example of a system 2100 that can include one or more computing systems 2101-1, 2101-2, 2101-3 and 2101-4, which may be operatively coupled via one or more networks 2109, which may include wired and/or wireless networks.

As an example, a system can include an individual computer system or an arrangement of distributed computer systems. In the example of FIG. 21, the computer system 2101-1 can include one or more modules 2102, which may be or include processor-executable instructions, for example, executable to perform various tasks (e.g., receiving information, requesting information, processing information, simulation, outputting information, etc.).

As an example, a module may be executed independently, or in coordination with, one or more processors 2104, which is (or are) operatively coupled to one or more storage media 2106 (e.g., via wire, wirelessly, etc.). As an example, one or more of the one or more processors 2104 can be operatively coupled to at least one of one or more network interface 2107. In such an example, the computer system 2101-1 can transmit and/or receive information, for example, via the one or more networks 2109 (e.g., consider one or more of the Internet, a private network, a cellular network, a satellite network, etc.).

As an example, the computer system 2101-1 may receive from and/or transmit information to one or more other devices, which may be or include, for example, one or more of the computer systems 2101-2, etc. A device may be located in a physical location that differs from that of the computer system 2101-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 22:
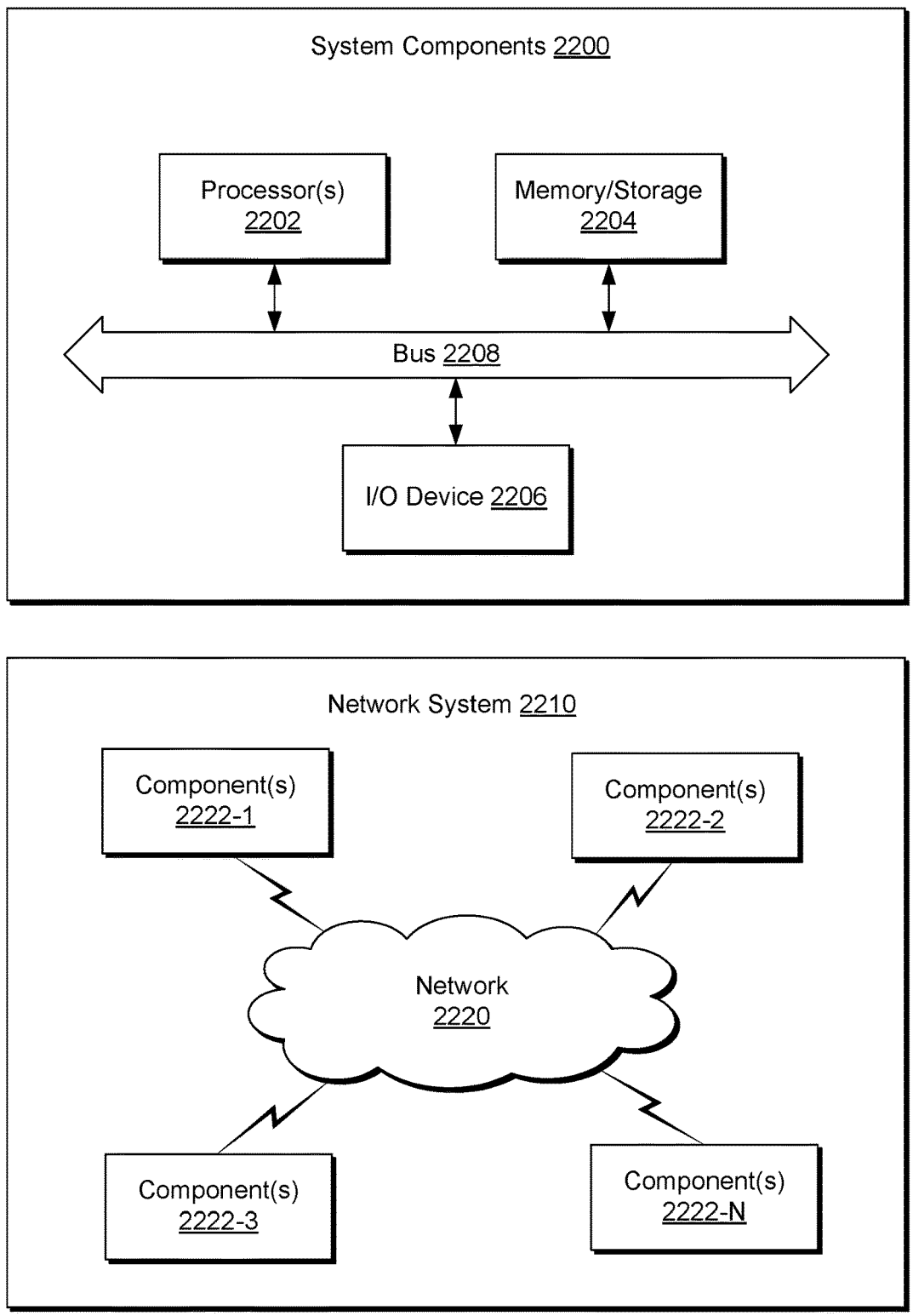
FIG. 22 illustrates example components of a system and a networked system.

FIG. 22 shows components of a computing system 2200 and a networked system 2210. The system 2200 includes one or more processors 2202, memory and/or storage components 2204, one or more input and/or output devices 2206 and a bus 2208. According to an embodiment, instructions may be stored in one or more computer-readable media (e.g., memory/storage components 2204). Such instructions may be read by one or more processors (e.g., the processor(s) 2202) via a communication bus (e.g., the bus 2208), which may be wired or wireless. The one or more processors may execute such instructions to implement (wholly or in part) one or more attributes (e.g., as part of a method). A user may view output from and interact with a process via an I/O device (e.g., the device 2206). According to an embodiment, a computer-readable medium may be a storage component such as a physical memory storage device, for example, a chip, a chip on a package, a memory card, etc.

According to an embodiment, components may be distributed, such as in the network system 2210. The network system 2210 includes components 2222-1, 2222-2, 2222-3, . . . 2222-N. For example, the components 2222-1 may include the processor(s) 2202 while the component(s) 2222-3 may include memory accessible by the processor(s) 2202. Further, the component(s) 2222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

BIBLIOGRAPHY, DOCUMENTS INCORPORATED BY REFERENCE

SPE-28440-PS "Improved Borehole Imaging by Ultrasonics", HAYMAN, A. J., et al (1998)
SPE-28440-MS "Improved ultrasonic imaging by ultrasonics", HAYMAN, A. J., et al (1994).
SPE-21947 "New ultrasonic caliper for MWD operations", ORBAN, J. J., et al (1991).
"Ultrasonic properties of oil-well drilling muds", Proceedings., IEEE Ultrasonics Symposium, Montreal, Que., 1989, pp. 327-332 vol. 1.
"Imaging: Getting the Picture Downhole", Schlumberger, Oilfield Review 27, September 2015.

What is claimed is:

1. A method comprising:
using a downhole tool, acquiring ultrasonic echo data of a borehole, wherein the ultrasonic echo data comprise time series echoes representative of material and borehole geometry responsive to reflection of ultrasonic energy that comprises a wide-band frequency range;
filtering the ultrasonic echo data using at least one selected filter of a plurality of filters for multi-band frequency filtering corresponding to different frequency ranges of the wide-band frequency range to generate filtered data, wherein each band of a plurality of bands of the wide-band frequency range includes a central frequency and a pass-band frequency and each filter of the plurality of filters includes a combination of one or more of low pass filter, high pass filter, and bandpass filters; and
processing the filtered data to generate attribute values representative of physical characteristics of the material, the borehole geometry, or the material and the borehole geometry wherein the attribute values include travel time at multiple frequencies proportional to a standoff distance between a transducer and a wall of the borehole and amplitude.

2. The method of claim 1, comprising storing the attribute values with corresponding data stamps that map the attribute values to respective borehole orientations and borehole depths.

3. The method of claim 2, comprising transmitting the attribute values with the corresponding data stamps from the downhole tool to surface equipment.

4. The method of claim 2, comprising rendering at least one of the attribute values using surface equipment to visualize the physical characteristics of the material, the borehole geometry, or the material and the borehole geometry.

5. The method of claim 1, wherein the downhole tool comprises at least one transmitter that emits the ultrasonic energy in the wide-band frequency range.

6. The method of claim 5, wherein the wide-band frequency range comprises a frequency minimum of 50 kHz and comprises a frequency maximum of 1 MHz.

7. The method of claim 5, wherein the emission of the ultrasonic energy in the wide-band frequency range is a single emission that is in response to a single excitation of the at least one transmitter.

8. The method of claim 1, wherein the filtering using the at least one selected filter of the plurality of filters for multi-band frequency filtering comprises an analog filter or a digital filter.

9. The method of claim 1, wherein the different frequency ranges vary beam diameter, vary wavelength to interrogate a surface of the borehole at different sensitivities, and vary energy attenuation in drilling fluid as a function of frequency.

10. The method of claim 1, wherein the attribute values are extracted from the ultrasonic echo data being responsive to a single emission of the ultrasonic energy that comprises the wide-band frequency range.

11. The method of claim 1, wherein the processing the filtered data comprises processing first filtered data generated by application of a first filter, processing second filtered data generated by application of a second filter or processing the first filtered data and the second filtered data.

12. The method of claim 11, wherein the processing the first filtered data and the second filtered data generates a first physical characteristic of the material or/and the borehole geometry via the processing the first filtered data and/or generates a second physical characteristic of the material or/and the borehole geometry via the processing the second filtered data.

13. The method of claim 1, comprising
rendering, using at least a portion of the attribute values,
a visualization of at least one of a borehole texture using echo amplitude of a high-frequency bandpass of the filtered data;
a borehole shape image using travel time of the high-frequency bandpass of the filtered data;
a borehole shape image using travel time of a low-frequency bandpass of the filtered data that is immune to borehole fluid acoustic attenuation, borehole enlargement and borehole surface rugosity; and
a formation material image using the echo amplitude with sensitivity to acoustic impedance of the formation material image that is higher than the borehole surface rugosity and/or the borehole texture.

14. A non-transitory processor readable medium comprising processor-executable instructions, executable to instruct a downhole tool to:
acquire ultrasonic echo data of a borehole, wherein the ultrasonic echo data comprise time series echoes representative of material and borehole geometry responsive to reflection of ultrasonic energy that comprises a wide-band frequency range;
filter the ultrasonic echo data using at least one selected filter of a plurality of filters for multi-band frequency filtering corresponding to different frequency ranges of the wide-band frequency range to generate filtered data, wherein each band of a plurality of bands of the wide-band frequency range includes a central frequency and a pass-band frequency and each filter of the plurality of filters includes a combination of one or more of low pass filter, high pass filter, and bandpass filters; and
process the filtered data to generate frequency-dependent attribute values representative of physical characteristics of the material, the borehole geometry, or the material and the borehole geometry wherein the attribute values include travel time at multiple frequencies proportional to a standoff distance between a transducer and a wall of the borehole and amplitude.

15. A downhole tool comprising:
an ultrasonic energy emitter and echo receiver that receives time series echo data of a borehole responsive to ultrasonic energy emissions that comprise a wide-band frequency range;
a plurality of filters configured to perform a bandpass filtering of the echo data at one or more different central frequencies to generate the bandpass filtered echo data, wherein each band of a plurality of bands of the wide-band frequency range includes a central frequency and a pass-band frequency and each filter of the plurality of filters includes a combination of one or more of low pass filter, high pass filter, and bandpass filters and the bandpass filtered echo data has values that includes travel time at multiple frequencies proportional to a standoff distance between a transducer and a wall of the borehole and amplitude;
telemetry circuitry; and
a downhole system that controls the ultrasonic energy emitter and the echo receiver, controls the plurality of filters, controls extraction of attributes of the bandpass filtered echo data at the one or more different central frequencies, controls storage of the attributes, and controls transmission of at least a portion of the attributes via the telemetry circuitry.

16. The downhole tool of claim 15, wherein the one or more different central frequencies to perform bandpass filtering are distributed at desired frequency gaps in a frequency band of the ultrasonic energy emissions by the ultrasonic energy emitter and the echo receiver.

17. The downhole tool of claim 15, wherein the bandpass filtered echo data comprise frequency-dependent attributes from a single excitation emitted by the ultrasonic energy emitter and the echo receiver.

18. The downhole tool of claim 15, further comprising digitally controlled voltage step-up circuitry that steps-up an input voltage to a higher voltage for the ultrasonic energy emissions from the ultrasonic energy emitter and the echo receiver.

19. The downhole tool of claim 15, further comprising one or more microprocessors.

20. The downhole tool of claim 15, further comprising a trained machine model.

* * * * *